(12) United States Patent
Amick et al.

(10) Patent No.: US 12,530,521 B2
(45) Date of Patent: Jan. 20, 2026

(54) COMPUTER SYSTEM AND METHOD FOR PRESENTING FORENSIC DATA IN A USER INTERFACE BASED ON HASH LISTS AND GENERATING HASH LISTS THEREFOR

(71) Applicant: Magnet Forensics Inc., Waterloo (CA)

(72) Inventors: Harold C. Amick, Winchester, VA (US); Stephen Gemperle, Auburn, AL (US)

(73) Assignee: Magnet Forensics Inc., Waterloo (CA)

( * ) Notice: Subject to any disclaimer, the term of this patent is extended or adjusted under 35 U.S.C. 154(b) by 103 days.

(21) Appl. No.: 18/326,375

(22) Filed: May 31, 2023

(65) Prior Publication Data

US 2023/0385527 A1 Nov. 30, 2023

Related U.S. Application Data

(60) Provisional application No. 63/347,322, filed on May 31, 2022.

(51) Int. Cl.
*G06F 3/0481* (2022.01)
*G06F 3/04842* (2022.01)
(Continued)

(52) U.S. Cl.
CPC .......... *G06F 40/117* (2020.01); *G06F 3/0481* (2013.01); *G06F 3/04842* (2013.01); *G06F 16/2255* (2019.01)

(58) Field of Classification Search
None
See application file for complete search history.

(56) References Cited

U.S. PATENT DOCUMENTS 9,083,850 B1 * 7/2015 Higgs ..................... H04N 7/147
9,176,964 B1 * 11/2015 McCreight .............. G06F 16/10
(Continued)

FOREIGN PATENT DOCUMENTS

WO WO-2016101006 A1 * 6/2016 ....... G06F 17/30843

OTHER PUBLICATIONS

Hanh, "All your hashes are belong to US: An overview of malware hashing algorithms", G Data Blog, Sep. 30, 2021, downloaded from https://www.gdatasoftware.com/blog/2021/09/an-overview-of-malware-hashing-algorithms.
(Continued)

*Primary Examiner* — Tuyetlien T Tran
(74) *Attorney, Agent, or Firm* — Own Innovation Inc.; James W. Hinton; Kent C. Howe

(57) ABSTRACT

Systems and methods for presenting forensic data in a forensic data review user interface and for generating reference hash sets are provided. The method includes receiving a selection via the forensic data review user interface to display a forensic data collection; in response to receiving the selection, hashing at least one forensic data item in the forensic data collection to generate a hash value; determining that the hash value matches a reference hash value in at least one reference hash set; varying a default display property of the at least one forensic data item according to a presentation rule encoded in the reference hash set and associated with the reference hash value to obtain a varied display property; and displaying the forensic data collection in the forensic data review user interface including the at least one forensic data item according to the varied display property.

19 Claims, 13 Drawing Sheets

(51) Int. Cl.
*G06F 16/22* (2019.01)
*G06F 40/117* (2020.01)

(56) References Cited

U.S. PATENT DOCUMENTS

| | | | |
|---|---|---|---|
| 11,128,463 B1* | 9/2021 | Thompson | G16Y 40/10 |
| 2009/0165142 A1* | 6/2009 | Adelstein | H04L 43/0876 |
| | | | 726/26 |
| 2009/0171961 A1* | 7/2009 | Fredrickson | G06Q 10/06 |
| 2009/0288164 A1* | 11/2009 | Adelstein | H04L 63/123 |
| | | | 726/22 |
| 2015/0047034 A1* | 2/2015 | Burnham | H04L 63/1441 |
| | | | 726/23 |
| 2015/0074007 A1* | 3/2015 | Gabriel | G06F 16/93 |
| | | | 707/706 |
| 2016/0080397 A1* | 3/2016 | Bacastow | H04L 63/1433 |
| | | | 726/1 |
| 2017/0111594 A1* | 4/2017 | Ayers | H04L 67/04 |
| 2018/0032518 A1* | 2/2018 | Kordasiewicz | G06F 16/338 |
| 2019/0132348 A1* | 5/2019 | Ng | H04L 9/3242 |
| 2020/0374491 A1* | 11/2020 | DeAngelus | G06V 10/22 |
| 2020/0396230 A1* | 12/2020 | Liu | H04L 63/1416 |
| 2021/0011955 A1 | 1/2021 | Kordasiewicz et al. | |
| 2021/0049264 A1 | 2/2021 | Barrow et al. | |
| 2021/0306375 A1* | 9/2021 | Patel | G06F 21/53 |
| 2021/0400063 A1* | 12/2021 | Tackabury | H04L 69/16 |
| 2022/0224955 A1* | 7/2022 | Sharma | H04N 21/23418 |
| 2023/0037544 A1* | 2/2023 | Stein | G06F 16/2255 |
| 2023/0094735 A1* | 3/2023 | Krasnov | G06F 8/71 |
| | | | 726/23 |
| 2023/0153469 A1* | 5/2023 | Lee | G06F 21/64 |
| | | | 726/26 |
| 2023/0190100 A1* | 6/2023 | Stump | A61B 5/021 |
| | | | 600/301 |
| 2023/0308442 A1* | 9/2023 | Lejin P J | H04L 9/3234 |
| 2023/0342455 A1* | 10/2023 | Yarabolu | G06F 21/554 |

OTHER PUBLICATIONS

Magnet Forensics Inc., "AXIOM at Work: Building a Gold Build Hash-Set For Use in Magnet AXIOM", downloaded from https://web.archive.org/web/20200926210922/https://www.magnetforensics.com/resources/building-a-gold-build-hash-set-for-use-in-magnet-axiom/, Sep. 26, 2020.

Magnet Forensics Inc., "Cross-Case Searching for Tagged Identifiers in Project Prague Beta", downloaded from https://www.magnetforensics.com/blog/cross-case-searching-for-tagged-identifiers-in-project-prague-beta, Jun. 29, 2021.

* cited by examiner

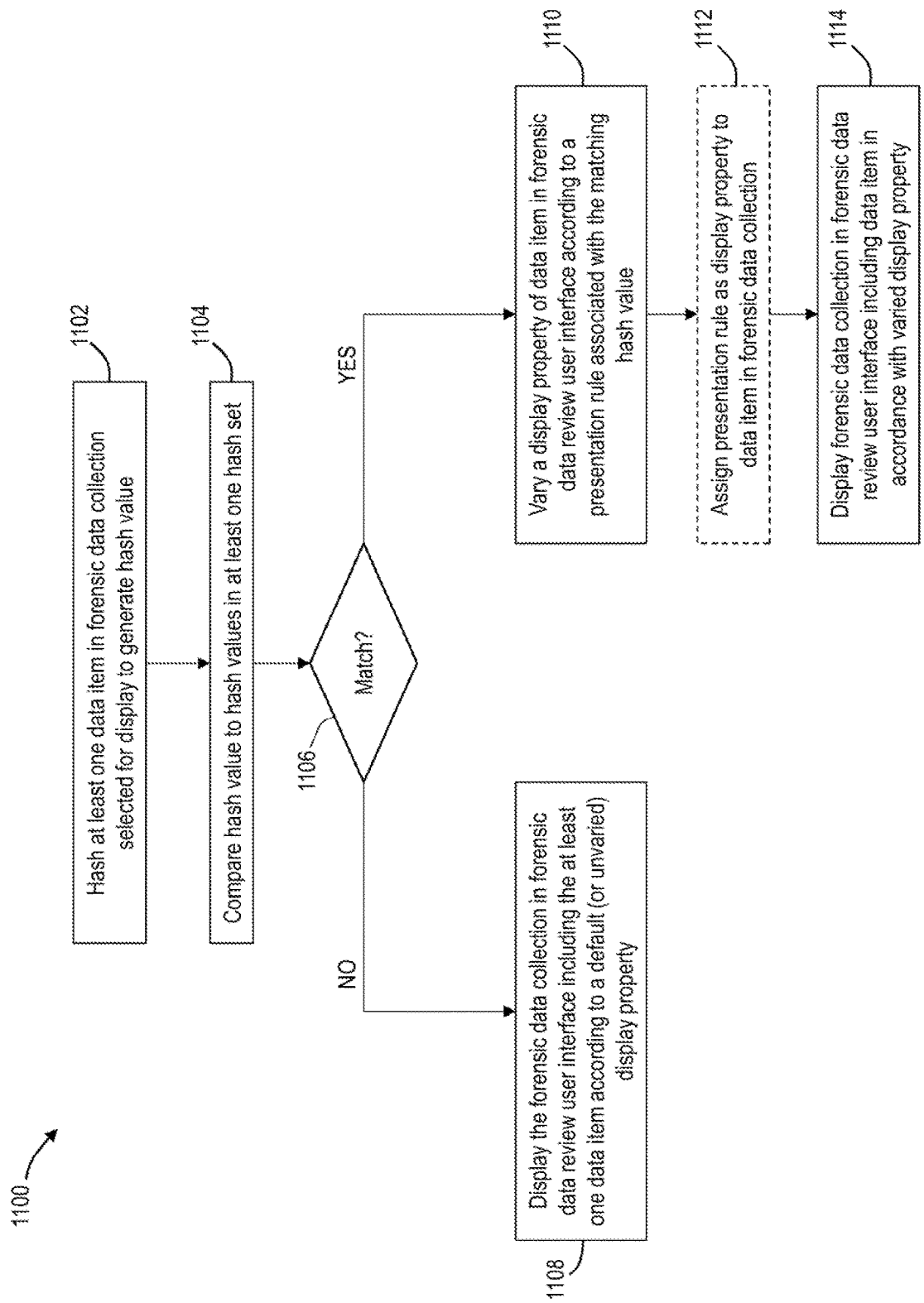

COMPUTER SYSTEM AND METHOD FOR PRESENTING FORENSIC DATA IN A USER INTERFACE BASED ON HASH LISTS AND GENERATING HASH LISTS THEREFOR

TECHNICAL FIELD

The following relates generally to digital forensics, and more particularly to systems and methods for managing processing, storage, and display/presentation of forensic data for forensic investigation on a computer using hashing.

INTRODUCTION

Oftentimes digital forensic examiners review the same icons, images, and documents in casework. These same icons, images, and documents present redundancies and inefficiencies in the forensic review process. Existing attempts at hash sets, such as the National Software Reference Library (NSRL), attempt to remove many of the redundant files for forensic examiners; nevertheless, many such hash sets still create noise in the casework.

Similarly, in forensics investigations, it can be advantageous to be able to identify relevant (i.e., relevant to the investigation) and irrelevant data items and files across investigations and across investigators to simplify and expedite review and focus investigative efforts.

Using existing techniques, when a forensic investigator is reviewing a forensic data collection, the forensic investigator often has to look at the same items multiple times, or multiple investigators have to review and ignore the same items. In conventional software, where two forensic investigators work on different cases but would use the same hash database, version control issues may arise. For example, once a first forensic investigator concludes a first case, the first forensic investigator pushes updates to the hash database, and a second forensic investigator must decide whether to update their own hashes pulled from the hash database and start a second case over or accept working with now out-of-date hashes.

Accordingly, there is a need for an improved system and method for performing digital forensics review that overcomes at least some of the disadvantages of existing systems and methods. Specifically, there is a need for a more efficient means of cross-referencing hashes across cases and across forensic investigators and a further need for forensic investigation and hashing technology that does not require one forensic investigator to wait for another forensic investigator to finish a case before updating a hash database.

SUMMARY

A method of presenting forensic data in a forensic data review user interface is provided. The method includes executing via a computing device comprising one or more processors: receiving a selection via the forensic data review user interface to display a forensic data collection stored in a data storage device; in response to receiving the selection, hashing at least one forensic data item in the forensic data collection to generate a hash value; determining that the hash value matches a reference hash value in at least one reference hash set; varying a default display property of the at least one forensic data item according to a presentation rule encoded in the reference hash set and associated with the reference hash value to obtain a varied display property; and displaying the forensic data collection in the forensic data review user interface including the at least one forensic data item, wherein the at least one forensic data item is displayed according to the varied display property.

The varied display property may include instructions to exclude the at least one forensic data item from review by not displaying the at least one forensic data item in the forensic data review user interface.

Excluding the at least one forensic data item from review may include encoding a presentation rule that the at least one forensic data item is not to be displayed in further forensic investigations.

The varied display property may include instructions to exclude the at least one forensic data item from review by displaying the at least one forensic data item less prominently in the forensic data review user interface than other forensic data items in the forensic data collection whose display properties do not comprise instructions to exclude the further forensic data items.

The varied display property may include instructions to include the at least one forensic data item in review by displaying the at least one forensic data item in the forensic data review user interface.

Including the at least one forensic data item in review may include displaying the at least one forensic data item more prominently in the forensic data review user interface than further forensic data items whose display properties do not comprise instructions to include the further forensic data items.

The varied display property may include instructions for including and modifying the at least one forensic data item in review by generating and displaying a modified version of the at least one forensic data item in the forensic data review user interface.

Modifying the at least one forensic data item in review may include one or more of blurring, greyscaling, depixelating, and redacting at least part of a copy of the at least one forensic data item to produce the modified version of the at least one forensic data item.

The method may further include encoding the presentation rule in the reference hash set and associating the presentation rule with the reference hash value.

The reference hash set may be common to multiple users across multiple forensic data collections.

The method may further include receiving further presentation rules to be encoded in the reference hash set and associated with the reference hash value.

The method may further include receiving metadata comprising descriptive data indicating why the hashed data item was added to the reference hash set or why the presentation rule was applied to the hashed data item.

Hashing the at least one forensic data item in the forensic data collection to generate the hash value may include performing the hashing using a cryptographic hash algorithm or a fuzzy hashing algorithm.

A method of generating a reference hash set for managing presentation of forensic data in a forensic data review user interface is provided. The method includes executing via a computing device comprising one or more processors: displaying a forensic data collection including at least one forensic data item in the forensic data review user interface; receiving a selection via the forensic data review user interface of the at least one forensic data item to be added to a reference hash set; in response to receiving the selection, hashing the at least one forensic data item to obtain a reference hash value and storing the reference hash value in the reference hash set; generating and displaying a tagging user interface; receiving via the tagging user interface reference hash categorization data including at least one presentation rule specifying a display property of the at least one data item in the forensic data review user interface; and storing the hash categorization data in the reference hash set in association with the reference hash value such that when a hash value of a second forensic data item is determined to match the reference hash value, the second forensic data item is displayed in the forensic data review user interface according to the at least one presentation rule.

Storing the reference hash value in the reference hash set may include checking the reference hash set to determine whether the reference hash value matches any hash value already stored in the reference hash set and deleting the reference hash value from the reference hash set where there is a match.

The varied display property may include one of instructions to exclude the at least one forensic data item from review by not displaying the at least one forensic data item in the forensic data review user interface, instructions to exclude the at least one forensic data item from review by displaying the at least one forensic data item less prominently in the forensic data review user interface than further forensic data items whose display properties do not comprise instructions to exclude the further forensic data items, instructions to include the at least one forensic data item in review by displaying and blurring, greyscaling, depixelating, or redacting at least a part of a copy of the at least one forensic data item in the forensic data review user interface, and instructions to include the at least one forensic data item in review by displaying the at least one forensic data item in the forensic data review user interface.

Receiving a selection via the forensic data review user interface of the at least one forensic data item to be added to a reference hash set may include: displaying a plurality of reference hash sets; and receiving a selection of the reference hash set from among the plurality of reference hash sets.

Specifying the display property may include varying the display property.

A system for presenting forensic data in a forensic data review user interface based on a reference hash set is provided. The system comprises at least one data storage device and at least one processor. The at least one processor is configured to: receive a selection via the forensic data review user interface to display a forensic data collection stored in a data storage device; in response to receiving the selection, hashing at least one forensic data item in the forensic data collection to generate a hash value; compare the hash value to a reference hash value in the at least one reference hash set; if the hash value does not match the reference hash value, then: display the forensic data collection in the forensic data review user interface including the at least one forensic data item, wherein the at least one forensic data item is displayed according to a default display property; and if the hash value matches the reference hash value, then: vary the default display property of the at least one forensic data item according to a presentation rule encoded in the reference hash set and associated with the reference hash value to obtain a varied display property; and display the forensic data collection in the forensic data review user interface including the at least one forensic data item, wherein the at least one forensic data item is displayed according to the varied display property.

The varied display property may include one of instructions to exclude the at least one forensic data item from review by not displaying the at least one forensic data item in the forensic data review user interface, instructions to exclude the at least one forensic data item from review by displaying the at least one forensic data item less prominently in the forensic data review user interface than further forensic data items whose display properties do not comprise instructions to exclude the further forensic data items, instructions to include the at least one forensic data item in review by displaying and blurring, greyscaling, depixelating, or redacting at least a part of a copy of the at least one forensic data item in the forensic data review user interface, and instructions to include the at least one forensic data item in review by displaying the at least one forensic data item in the forensic data review user interface.

A method of presenting forensic data in a forensic data review user interface based on at least one reference hash set is provided. The method includes executing via a computing device comprising one or more processors: receiving a selection via the forensic data review user interface to display a forensic data collection stored in a data storage device; in response to receiving the selection, hashing at least one forensic data item in the forensic data collection to generate a hash value; comparing the hash value to a reference hash value in the at least one reference hash set; if the hash value matches the reference hash value, then: varying a default display property of the at least one forensic data item according to a presentation rule encoded in the reference hash set and associated with the reference hash value to obtain a varied display property; and displaying the forensic data collection in the forensic data review user interface including the at least one forensic data item, wherein the at least one forensic data item is displayed according to the varied display property; otherwise: displaying the forensic data collection in the forensic data review user interface including the at least one forensic data item, wherein the at least one forensic data item is displayed according to the default display property.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 10 is a flow diagram of a method of generating and displaying a forensic data review user interface based on one or more reference hash sets, according to an embodiment.

DETAILED DESCRIPTION

Figure 1:
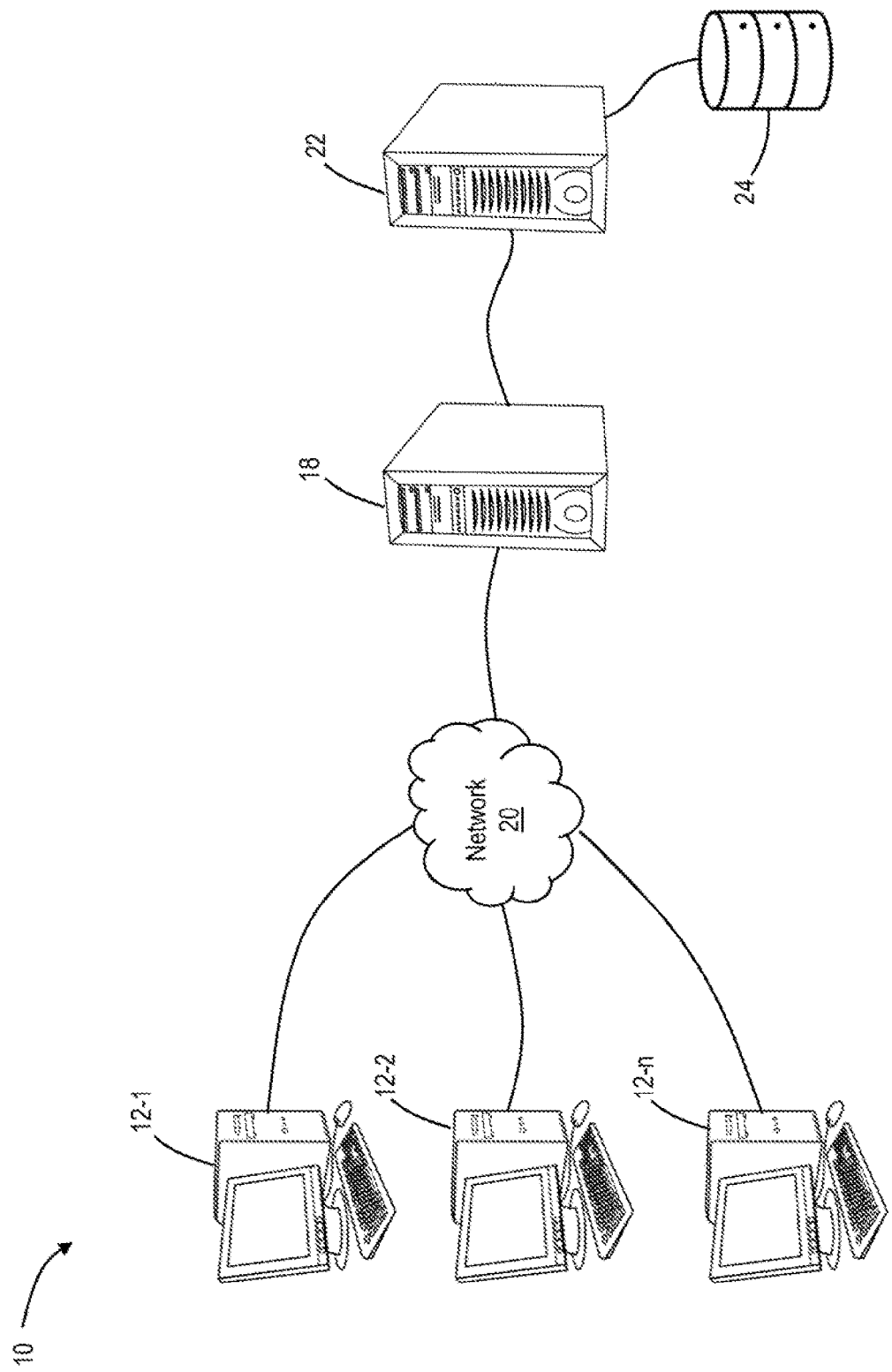
FIG. 1 is a schematic diagram of a computer system for forensic data review using reference hash sets, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

When functionality is described with respect to other forensic examiners, it will be readily apparent that the functionality also operates with respect to the same forensic examiner at another time and/or place. For example, a component of a device/article operating in respect of a first forensic examiner for the benefit of another forensic examiner may also be understood as operating for the benefit of the first forensic examiner at the other time and/or place.

The following relates generally to systems and methods for hashing data, and more particularly to systems and methods for hashing data in the context of forensic investigation on an ad hoc basis. Such an ad hoc basis may advantageously allow a forensic examiner to hash a data item by simply "right-clicking" and selecting to hash from among one or more options visible via the "right click", for example via a pop-up menu.

Hashing and associated algorithms and techniques are commonly employed in the field of forensic investigation. However, existing techniques fail to provide for easy and efficient hashing ad hoc or "on the fly", in a forensic data review user interface ("FDRUI"). Such hashing may advantageously allow a forensic investigator user to simply select a data item or data artifact when reviewing the data item or artifact in the FDRUI (e.g. by "right-clicking") and select hashing and saving options to cause the computer system to hash the selected data item or artifact and save the hashed data item or artifact to a reference hash set stored and maintained by the computer system. This functionality may be present across a network as new devices are added in.

The systems, methods, servers, terminals, and devices described herein have physical existence and/or manifest a discernible physical effect or change. The systems, methods, servers, terminals, and devices described herein relate to the manual or productive arts, meaning those arts involving or concerned with applied and industrial sciences. The computer systems described herein have a material effect on the working of the invention and cooperate with other elements of the claimed invention.

Where the computer systems herein are programmed to run an algorithm, the computer processes the algorithm in a novel and inventive manner and the processing of the algorithm on the computer solves a problem in the functioning of the computer. The computer and the algorithm form part of a single actual invention that solves a problem related to the manual or productive arts. Running the algorithm(s) described herein on the computer improves the functioning of the computer, and the computer and the algorithm(s) together form a single actual invention that solves a problem related to the manual or productive arts.

The functional improvement particular to the systems, methods, servers, terminals, and devices described herein includes but is not limited to saving backend processing and foreground display through providing the functionality of creating and adding to reference hash sets in the FDRUI and changing a display status of hashed data items in the reference hash set in the FDRUI. Displaying forensic data collections in the FDRUI based on presentation rules encoded as attributes of the reference hash set by forensic examiners may advantageously enable multiple forensic examiner users to add to the same reference hash set. Furthermore, a single forensic examiner may add hashed data items to a reference hash set. Attributes of the added hashed data items may vary display properties of corresponding data items in the FDRUI across multiple forensic investigator users and/or across multiple forensic data collections and/or across multiple forensic investigations. Accordingly, the systems, methods, server, terminals, and devices implementing the foregoing functionality advantageously institutionalize knowledge of reviewed forensic data using the reference hash set and the presentation rules encoded therein such that unimportant data items may advantageously be ignored and important data items advantageously made more prominent. Information generated by one forensic examiner in respect of a data item, for example reasons as to relevance or irrelevance, may be memorialized for the benefit of other forensic examiners in order to avoid duplicate analysis or generation of such reasons. The foregoing functionality ultimately reduces the amount of forensic data review required. Reduced forensic data review improves computer efficiency through avoiding unnecessary processing, for example where irrelevant data items would otherwise be repeatedly viewed by multiple examiners and/or where forensic examiners would otherwise review data items without knowing the relevance of the data items to a particular forensic investigation.

The foregoing functionality may further advantageously reduce time spent reviewing identical and/or irrelevant files, which reduces computer processing in processing and displaying such identical files. For example, where a data item is reviewed and its relevance assessed once, hashing other data items before review by a forensic examiner may advantageously identify duplicate data items that need not be reviewed again, even if otherwise relevant.

The systems, methods, servers, terminals, and devices as described herein are described in the context of forensic data review for forensic investigations but may, in other embodiments, be applied to other systems, methods, servers, terminals, and/or devices for data review and presentation and provide similar benefits.

Referring now to FIG. 1, shown therein is a schematic diagram of a computer system 10 for managing the processing, storage, and presentation of forensic data for review in a forensic investigation on a computer, according to an embodiment.

The processing, storage, and presentation steps of the computer system 10 may use hashing.

The system 10 includes a plurality of user devices 12-1, 12-2, . . . , 12-n for use by forensic examiners (not shown) in the management and review of forensic data. User devices 12-1, 12-2, . . . , 12-n may be referred to collectively as the user devices 12 and generically as the user device 12. In an embodiment, each user device 12 is used by a different forensic examiner in a different location when reviewing a forensic data collection pursuant to a forensic investigation. The user devices 12 may be located in the same room or the same building. The user devices 12 may be located remotely to one another.

The system 10 includes a server platform 18 which communicates with the user devices 12 via a network 20. The server platform 18 also communicates with a data storage server 22. The data storage server 22 communicates with a data storage device 24, which may be locally or remotely accessible to the data storage server 22. In some cases, the data storage server 22 and the server platform 18 may be implemented on the same device.

The server platform 18 may be a purpose-built machine designed specifically for managing the processing, storage, and presentation of forensic data. In particular, the server platform 18 may be configured to generate and maintain (e.g., add to) one or more reference hash sets of forensic data and present or display forensic data in a graphical user interface (such as a forensic data review user interface) based on properties or attributes of hashed items in the reference hash sets. The reference hash sets may be stored in one or more hash set databases. The server platform 18 is configured to hash data according to instructions provided by the user devices 12 which are generated in response to a user input from the forensic examiner at the user device 12. When a forensic examiner using user device 12, for example, indicates to hash a data item or data artifact, the forensic examiner using the user device 12 may simply "right-click" on the data item or data artifact and select "hash" and "save" or other similar options according to a pop-up menu or other visual display. The server platform 18 hashes the selected data item or data artifact in response to the user input and adds the resultant hash to a hash set. Whether any one or more servers performs the hashing operation may be determined by network protocols.

In an embodiment, the reference hash set is a centralized hash set that may be modified (e.g., by addition of hashes) by any one or more of the user devices 12. The reference hash set is centrally stored within the data storage device 24.

In an embodiment, the reference hash set is a decentralized hash set that may be modified (e.g., by addition of hashes) by any one or more of the user devices 12. The decentralized hash set may be stored locally on each user device 12. A portion of the decentralized hash set may be stored locally on each user device 12 and/or the data storage device 24 and/or other servers. Part or all of the decentralized hash set may be accessible through a LAN, a WAN, or a cloud server.

The reference hash set may be an institutional hash set hashed, reviewed, and/or used by multiple forensic examiners. The institutional hash set serves as a repository of forensic examiner experience in reviewing and tagging data items.

The reference hash set may be a collaborative hash set hashed, reviewed, and/or used by multiple forensic examiners in the course of one or more forensic investigations. The collaborative hash set serves as a means of collaboration for the multiple forensic examiners in the course of the one or more forensic investigations.

The data storage server 22 is configured to store the reference hash set in the data storage device 24.

The data storage server 22 is also configured to store forensic data as a forensic data collection. A forensic data collection may include forensic data collected or extracted from one or more electronic storage media sources of one or more target devices.

Generally, a forensic data collection may be linked or otherwise associated with a forensic repository stored by the data storage server 22 in the data storage device 24. For example, a forensic repository may be represented by a forensic repository identifier in the data storage device 24. The forensic repository may be stored by the data storage server 22 in the data storage device 24 as the one or more reference hash sets comprising hashes of one or more data items from the forensic data collection. The forensic repository may be stored by the data storage server 22 in the data storage device 24 as data structures other than the one or more reference hash sets. The forensic repository may be stored by the data storage server 22 in the data storage device 24 by means other than the one or more reference hash sets in particular or data structures in general.

A reference hash set may be linked to one or more forensic repositories and/or forensic investigations.

Certain forensic data (e.g., one or more forensic data collections) and non-forensic data may then be stored in association with the forensic repository (using, for example, the forensic repository identifier). Generally, forensic data includes data collected or extracted from the target devices and any further data outputs generated therefrom, such as through the processing or analysis of the forensic data.

For example, forensic data may include any one or more of a forensic image acquired from a target device, data items (including data artifacts) extracted from the forensic image or the target device, and analytics outputs generated from analyzing extracted data items (e.g., using machine learning, artificial intelligence, or other analytics techniques).

In an embodiment, as forensic examiners work on forensic investigations and review and identify data items, each data item is hashed by a user device 12, and the hashed data item is transmitted via the data storage server 22 to the data storage device 24. The hashed data items stored in the data storage device 24 are pushed to the user devices 12 (including user devices 12 operated by different forensic examiners and user devices 12 operated by the same forensic examiners at different points in time) reviewing the same or similar data items in open forensic investigations. In an embodiment, pushing the hashed data items stored in the data storage device 24 to the user devices 12 includes providing the user devices 12 with a notification that allows the user devices 12 to update hashes on the user devices 12 in an open forensic investigation. Such updating may be effected by clicking the provided notification.

In an embodiment, forensic examiners work on forensic investigations and review and identify data items offline, i.e., while one or more user devices 12 is not in communication with the server platform 18. When each user device 12 regains communication with the server platform 18, the hashed data items hashed by the user device 12 since the user device 12 was last in communication with the server platform 18 are transmitted via the data storage server 22 to the data storage device 24. When each user device 12 regains communication with the server platform 18, the hashed data items stored in the data storage device 24 since the user device 12 was last in communication with the server platform 18 are pulled by the user device 12.

Non-forensic data includes data related to and stored in association with the forensic repository that is not itself forensic data. Non-forensic data may include, for example, user access permissions (e.g., which forensic examiner users may review and/or conduct acquisition or extraction of forensic data) and descriptive data or information about a given forensic investigation. Descriptive data may include, for example, an investigation type (e.g., criminal (homicide, sexual exploitation, fraud), corporate (insider threat analysis)). In some cases, descriptive data, such as a case type, may be used to determine how forensic data is processed or displayed (e.g., which forensic data extraction or processing tools are applied, which data artifacts are extracted). For example, a "fraud" case type may value different types of data items and data artifacts to a "child exploitation" case type or "corporate insider threat" case type and may display those differently valued data items and artifacts differently (e.g., forensic data review user interfaces may have different content and configurations based on case type or user preferences).

The data storage server 22 may also store forensic examiner or user account information in the data storage device 24 (e.g., as a user profile). In some cases, user profile data may be used by the server platform 18 to determine hash set sharing or collaboration across users and across forensic investigations.

The server platform 18 may be configured to execute a forensic data review software application (not shown) for enabling investigation of forensic data. Software executing on the user devices 12 may be used to communicate with the forensic data review software application on the server platform 18. Generally, the server platform 18 may generate and send data to the user device 12 for presentation and/or display in a graphical user interface.

Generally, the forensic data review software application is configured to present and/or display forensic data, such as a forensic data collection or subset thereof, in a graphical user interface for review by a forensic investigator at the user device 12.

In operation, the forensic data review software application may receive data from the user device 12 indicating that a selected displayed data item is to be added to a reference hash set. The data received from the user device 12 may be generated and sent by the user device 12 in response to a user input received via a user input device (not shown) as the user interacts with the user interface. In one embodiment, the user input device may be a computer mouse and the user input may be a "right click" or similar action using the mouse or other pointing device and subsequent selection of a "hash data item" or similar action from a list of operations displayed in a pop-up window or the like. In another embodiment, the user input device may be a computer keyboard. The user input device may be other computer peripherals.

The data sent from the user device 12 to the forensic data review software application at the server platform 18 may further include hash categorization data. The hash categorization data may be configured as one or more "tags" to be applied to the hashed data item. The hash categorization data may include presentation rules that are used by the forensic data review software application to determine how and whether to display or present a data item corresponding to a hashed data item (i.e., the data item from which the hash is generated) in a graphical user interface. The presentation rules may be stored as an attribute or property of the hashed data item in the hash set or of the data item in the forensic data collection. The hash categorization data may also include a hash creator and descriptive data indicating the reason why the data item was hashed and why the particular presentation rules were attributed to the data item. Such descriptive data may include a text string or the like specifying one or more reason(s) for applying a particular tag to the hashed data item. Such descriptive data may be supplied by the hash creator. Such descriptive data may be supplied and/or amended by subsequent users. Such descriptive data may further include other comments as provided by the forensic examiner(s).

The presentation rules for the data item may be configured by the user to be applied within a particular forensic investigation (e.g., across multiple forensic data repositories from multiple target devices, across multiple forensic data collections), across multiple forensic investigations, across multiple forensic investigators, and/or otherwise.

The data storage device 24 includes a centralized hash database. The centralized hash database includes the reference hash set. The centralized hash database may include further data in addition to the reference hash set, for example the descriptive data.

When generating user interfaces for display at the user device 12, the forensic data review software application may be further configured to reference the reference hash set and read presentation rules associated with one or more hashed data items and configure or alter presentation or display of the data item corresponding to each hashed data item based on the presentation rules. Generally, the presentation of the data item may be different than if the hashed data item had not been added to the reference hash set (i.e., different from a "default" or "unvaried" presentation). In some cases, presentation rules may cause a data item to be presented more prominently in the user interface so as to draw a forensic examiner's attention to the data item. In other cases, presentation rules may cause a data item to not be presented or displayed at all (e.g., if the data item is determined to be forensically irrelevant or irrelevant to the particular forensic investigation). Where certain data items are not displayed, a record of such data items may be generated and stored at the data storage device 24 and may be reviewable by the forensic examiner in a user interface. In some cases, a user may change a presentation rule of a data item through user input to the forensic data review user interface, such as after a forensic examiner has reviewed an "important" data item that has been more prominently displayed based on the hash set.

The forensic data review software application thus may enable the generation and use of a reference hash set for simplifying review of forensic data in a graphical user interface by forensic examiners. In particular, the forensic data review software application may enable knowledge about particular forensic data items developed by one forensic examiner to be effectively shared with one or more other forensic examiners through the use of the reference hash set.

The user devices 12, the server platform 18, the data storage server 22, and the data storage device 24 may be a server computer, desktop computer, notebook computer, tablet, PDA, smartphone, or another computing device. The devices and servers 12, 18, 22, 24 may include a connection with the network 20 such as a wired or wireless connection to the Internet. In some cases, the network 20 may include other types of computer or telecommunication networks. The devices and servers 12, 18, 22, 24 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. The processor may execute applications, computer readable instructions or programs. The applications, computer readable instructions, or programs may be stored in memory or in secondary storage or may be received from the Internet or other network 20. An input device may include any device for entering information into any one or more of the user devices 12. For example, the input device may be a keyboard, keypad, cursor-control device, touchscreen, camera, or microphone. A display device may include any type of device for presenting visual information. For example, the display device may be a computer monitor, a flat-screen display, a projector, or a display panel. An output device may include any type of device for presenting a hard copy of information, such as a printer, for example. The output device may also include other types of output devices such as speakers, for example. In some cases, the devices and servers 12, 18, 22, 24 may include multiple of any one or more of processors, applications, software modules, secondary storage devices, network connections, input devices, output devices, and display devices.

Although devices and servers 12, 18, 22, 24 are described with various components, one skilled in the art will appreciate that the devices and servers 12, 18, 22, 24 may in some cases contain fewer, additional, or different components. In addition, although aspects of an implementation of the devices and servers 12, 18, 22, 24 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices and servers 12, 18, 22, 24 and/or processor to perform a particular method.

In the description that follows, devices such as the user devices 12, the server platform 18, the data storage server 22, and the data storage device 24 are described performing certain acts. It will be appreciated that any one or more of these devices and/or servers may perform an act automatically or in response to an interaction by a user of that device and/or server. That is, the user of the device may manipulate one or more input devices (e.g., a touchscreen, a mouse, or a button) causing the device or server to perform the described act. In many cases, this aspect may not be described below, but it will be understood.

As an example, it is described below that the user devices 12 may send information to the server platform 18. For example, a forensic examiner using the user devices 12 may manipulate one or more input devices (e.g., a mouse and a keyboard) to interact with a user interface displayed on a display of the user device 12. Generally, the user device 12 may receive a user interface from the network 20 (e.g., in the form of a webpage). Alternatively, or in addition, a user interface may be stored locally at the user devices 12 (e.g., a cache of a webpage, a mobile application).

The server platform 18 may be configured to receive a plurality of information from each of the plurality of user devices 12. Generally, the information may comprise at least an identifier identifying the forensic examiner. For example, the information may comprise one or more of a username, e-mail address, password, or the like.

In response to receiving information, the server platform 18 may store the information in the data storage device 24. The data storage device 24 may correspond with secondary storage of the user devices 12 or of the data storage server 22. Generally, the data storage device 24 may be any suitable storage device such as a hard disk drive, a solid state drive, a memory card, or a disk (e.g., CD, DVD, Blu-ray). Moreover, data storage server 22 may be locally connected with the server platform 18, and the data storage device 24 may be locally connected with the data storage server 22. In some cases, the data storage server 22 and the data storage device 24 may be located remotely from the server platform 18 and accessible to the server platform 18 across the network 20, for example. In some embodiments, the data storage device 24 may include one or more storage devices located at a networked cloud storage provider.

The user devices 12 may be associated with forensic examiner accounts. The server platform 18 may be associated with a digital forensic investigation company. The data storage device 24 may store one or more forensic repositories, specifically one or more forensic data collections for each of the one or more forensic repositories. The forensic data collections include one or more data items and data artifacts. Any suitable mechanism for associating a user device 12 with an account is expressly contemplated. In some cases, the user device 12 may be associated with an account by sending credentials (e.g., a cookie, a login, a password) to the server platform 18. The server platform 18 may verify the credentials (e.g., determine that a received password matches a password associated with the account). If the user device 12 is associated with an account, the server platform 18 may consider further acts by that user device 12 to be associated with that account.

Figure 2:
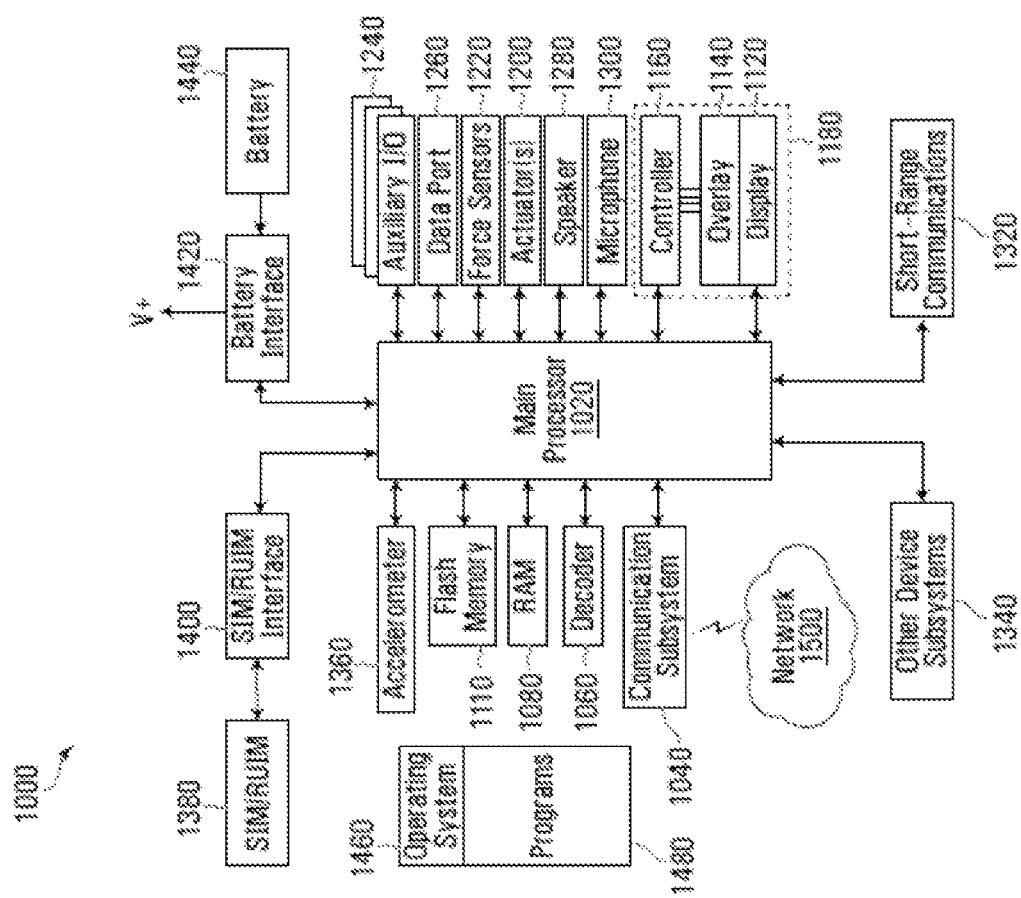
FIG. 2 is a block diagram of a computing device of the present disclosure, according to an embodiment.

Referring now to FIG. 2, shown therein is a block diagram of a computing device 1000 of the system 10 of FIG. 1, according to an embodiment. The computing device 1000 may be, for example, any one of user devices 12, the server platform 18, the data storage server 22, and the data storage device 24 of FIG. 1.

The computing device 1000 includes multiple components such as a processor 1020 that controls the operations of the computing device 1000. Communication functions, including data communications, voice communications, or both may be performed through a communication subsystem 1040. Data received by the computing device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The computing device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1110, a display 1120 (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a computing device generated by the processor 102 may be displayed on the touch-sensitive display 118.

The processor 1020 may also interact with an accelerometer 1360 as shown in FIG. 1. The accelerometer 1360 may be utilized for detecting direction of gravitational forces or gravity-induced reaction forces.

To identify a subscriber for network access according to the present embodiment, the computing device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1110 or performed using other techniques.

The computing device 1000 also includes an operating system 1460 and software components 1480 that are executed by the processor 1020 and which may be stored in a persistent data storage device such as the flash memory 1110. Additional applications may be loaded onto the computing device 1000 through the wireless network 1500, the auxiliary I/O subsystem 1240, the data port 1260, the short-range communications subsystem 1320, or any other suitable device subsystem 1340.

In use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the computing device 1000 may be similar. The speaker 1280 may output audible information converted from electrical signals, and the microphone 1300 may convert audible information into electrical signals for processing.

Figure 3:
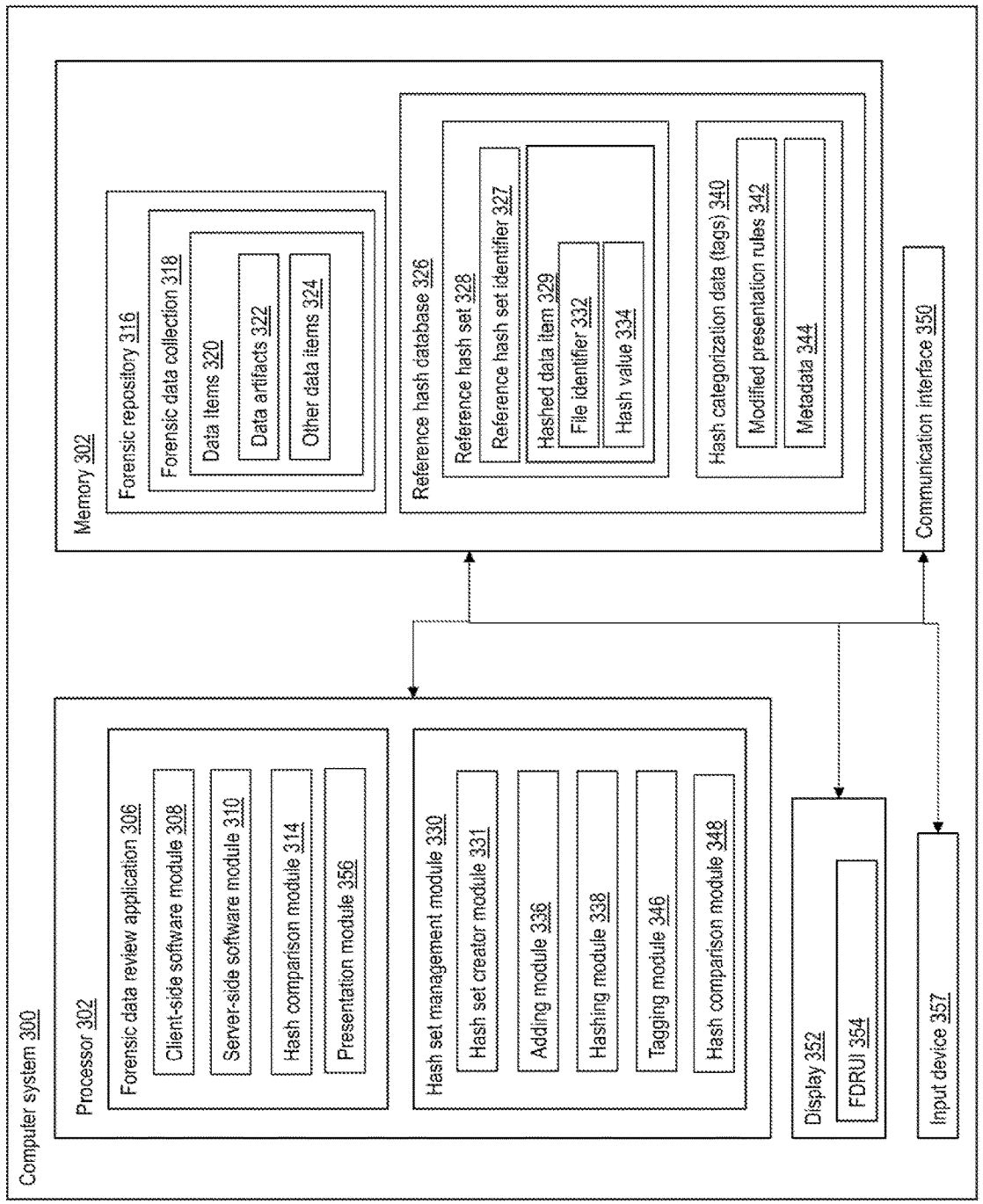
FIG. 3 is a block diagram of a computer system for forensic data review using reference hash sets, according to an embodiment.

Referring now to FIG. 3, shown therein is a computer system 300 for forensic data review using reference hash sets, according to an embodiment. The computer system 300 may be implemented by the system 10 of FIG. 1. The computer system 300 may be implemented on one or more computing devices, such as devices 18, 22, 24, and 12 of FIG. 1.

The computer system 300 includes a processor 302 and a memory 304 operable to communicate with the processor 302. The memory 304 stores data and computer-executable instructions which, when executed by the processor 302, cause the system 300 to perform the functions and provide the functionalities described herein.

The system 300 further includes a communication interface 350 for communicating with other devices, such as through receiving and sending data via a network connection (e.g., the network 20 of FIG. 1). The communication interface 350 may include a network interface (not shown).

The system 300 further includes a display 352 for displaying various data generated and stored by the computer system 300 in human-readable format. For example, the display 352 may be configured to display a forensic data review user interface (FDRUI) 354.

The system 300 further includes an input device 357 for providing a user input to the computer system 300. The input device 357 may include, for example, any one or more of a mouse or other pointing device, a keyboard, touchscreen, or the like. The processor 302 may be configured to generate user input data based on a user input provided to the computer system 300 via the input device 357.

The processor 302 includes a forensic data review application 306 for managing data for investigation by a forensic examiner, such as through the FDRUI 354. The forensic data review application 306 generates, processes, stores, and displays forensic data for review by a user.

The memory 304 stores a forensic repository 316. As previously described, the forensic repository 316 may be a collection of forensic data and non-forensic data related to a particular forensic investigation. The forensic repository 316 may include a forensic repository identifier (not shown) stored in memory 304 to which the forensic and non-forensic data is linked or associated in the memory 304.

The forensic repository 316 includes at least one forensic data collection 318. The forensic data collection 318 includes various forms of forensic data collected from a target device. The forensic data collection 318 may include a forensic image of electronic storage media of a target device.

The forensic data collection 318 includes data items 320. Generally, data items 320 can represent any data that can be retrieved from target device storage media, such as files, databases, folders, block data or byte ranges, volume information, file images, and the like. The data items 320 may be extracted or retrieved from the forensic image or from the target device. Data items 320 include data artifacts 322 and other data items 324. Data artifacts 322 are a type of data item that represents one or more other data items in a structured way. The data items 320 may be analyzed to generate analysis outputs (not shown).

The forensic data review application (FDRA) 306 is configured to manage, process, and display the data items 320 of the forensic data collection 318.

In the embodiment of FIG. 3, the FDRA 306 includes a client-side software module 308 and a server-side software module 310. The client-side software module 308 and the server-side software module 310 communicate with each other to provide functionalities of the FDRA 306. The client-side server module 308 includes client-side software components and is implemented by a client device such as, for example, user device 12 of FIG. 1. The server-side software module 310 includes server-side software components and is implemented by a server device, such as servers 18, 22 of FIG. 1.

In an embodiment, the server-side software module 310 stores and maintains the forensic repository 316, including the forensic data collection 318.

The server-side software module 310 is further configured to generate the FDRUI 354. The FDRUI 354 includes data items 320, or metadata thereof, from the forensic data collection 318. The server-side software module 310 may communicate the generated FDRUI 354 to the client-side software module 308 for display at the user device 12. The client-side software module 308 is configured to receive the generated FDRUI 354 from the server-side software module 310 and display the FDRUI 354 in a human-readable format via the display 352. The displayed FDRUI 354 is configured to receive a user input from a user interacting with the user interface. In response to the user input received at the communication interface 350, input data may be generated by the client-side software module 308 and communicated to the server-side software module 310. The server-side software module 310 may then generate another version of the FDRUI 354 based on the input data received from the client-side software module 308.

Generally, the FDRUI 354 may be configured with default presentation rules for displaying data items 320. The term "default" in this sense is used as described herein and generally refers to how data items 320 are presented in the FDRUI 354 if the presentation of such data items 320 is not modified through use of a reference hash set as described herein. For example, a default presentation rule may be "display all data items 320 in 'X' display format upon receiving 'Y' user input from the user". In another example, the FDRUI 354 may include a user interface for reviewing data artifacts 322 of a first data artifact type, which may be generated and displayed in response to a user input. The user interface for reviewing data artifacts 322 of the first data artifact type may include one or more default presentation rules for displaying data artifacts 322 of the first data artifact type in the user interface.

The FDRA 306 further includes a hash comparison module 314. The hash comparison module 314 is configured to compare a first hash value generated from a first data item to a second hash value generated from a second data item to determine whether the first and second hash values (and thus the first and second data items) are the same.

The processor 302 further includes a hash set management module 330. The hash set management module 330 is configured to generate, store, and maintain one or more reference hash sets 328. The reference hash sets 328 may be stored in a reference hash database 326.

Each reference hash set 328 includes at least one hashed data item 329 and a hash set identifier 327. The hash set identifier 327 uniquely identifies the hash set 328. Each hashed data item 329 includes a hash value 334 (e.g. a hash of file contents of a file), which is generated by hashing a data item 320, and a file identifier 332 for each hash value 334. The file identifier 332 identifies the data item 320 from which the hash value 334 was generated. The file identifier 332 may be the same file identifier used to uniquely identify the data item 320 in the forensic data collection 318.

The reference hash database 326 may be centralized or decentralized.

In an embodiment, the reference hash database 326 is centralized. In such an embodiment, all reference hash sets 328 are stored by the server-side software module 310, and the client-side software module 308 has access to the hash sets 328 via the server-side software module 310.

In an embodiment, the reference hash database 326 is decentralized. In such an embodiment, each reference hash set 328 is stored on the client-side software module 308 of the user device that created each reference hash set 328. The decentralized reference hash sets 328 may be copied to or stored temporarily or permanently on other user devices.

The hash database 326 may be created or maintained by the hash set management module 330.

The hash set management module 330, and components thereof, may be implemented at the server platform 18 of the system 10 of FIG. 1.

The hash set management module 330 includes a hash set creator module 331 for creating the reference hash set 328.

The hash set creator module 331 is configured to initialize the reference hash set 328 with a hash set identifier 327. The hash set creator module 331 may execute in response to input data received via the client-side software module 308 and communicated to the server-side software module 310, for example via the FDRUI 354.

The hash set creator module 331 is further configured to execute a hashing module 338 for generating the hash value 334. The hash set creator module 331 may then link or associate the hash value 334 with the file identifier 332.

In an embodiment, the hashing module 338 performs hashing using a cryptographic hashing algorithm. The cryptographic hashing algorithm may be a message digest hashing algorithm (e.g. MD-5), a "Secure Hash Algorithm" (e.g. SHA-1, SHA-256, etc.), or the like.

In another embodiment, the hashing module 338 performs hashing using a fuzzy hashing algorithm. For example, the hashing module 338 may match data items 320 whose corresponding hashed data items 329 meet a specified minimum percentage of a match, e.g., 80%. The fuzzy hashing algorithm may be applied in real-time collaboration among the user devices 12 according to the principles of the present disclosure. Where the hashing module 338 performs hashing using a fuzzy hashing algorithm, hashed data items 329 hashed according to the fuzzy hashing algorithm may be understood as mapping to further hashed data items (not shown), each of which meet a specified minimum percentage of a match. The specified minimum percentage of a match may be assessed between all the further hashed data items, between any two further hashed data items, or between a first further hashed data item and each other further hashed data item mapping to the hashed data item 329. The further hashed data items may further be hashed according to the cryptographic hash algorithm.

The hashing module 338 may be executed upon creation of the reference hash set 328 by the hash set creator module 331. The hashing module 338 may be part of the hash set creator module 331. The hashing module 338 may be called by the hash set creator module 331.

In an embodiment, a user input in the form of a "right click" selection of a data item 320 may be received at the communication interface 350, communicated to the client-side software module 308 and/or further communicated to the server-side software module 310. According to instructions received from either or both of the client-side software module 308 and/or the server-side software module 310, the display 352 may further be configured to generate a selectable element (e.g., a "pop-up menu") configured to receive further user input (e.g., a "left click" of an option from among a list of options in the pop-up menu). Accordingly, a user may thus "right click" on a data item 320 in the FDRUI 354 and have a "create hash set" option presented as a selectable element (e.g. a pop-up menu or window may be displayed) to initiate hash set creation in the system 300.

The hash set management module 330 also includes an adding module 336 for adding a hashed data item 329 to an existing reference hash set 328.

In contrast to the hash set creator module 331, the adding module 336 may be executed in response to a user input selecting an existing reference hash set 328 to which to add a new hashed data item 329. The adding module 336 is configured to execute hashing module 338 to generate a hash value 334 from the data item 320.

The scenario of adding a hashed data item 329 to an existing reference hash set 328 may differ from the scenario of creating a hash set 328 (and adding a first hashed data item 329 to the newly created hash set 328) in at least two respects. Firstly, certain data generated upon creating the reference hash set 328, such as reference hash set identifier 327 and potentially which users can access the reference hash set 328, may not be generated in the adding scenario and may be selected from a list or the like of existing reference hash sets 328. Secondly, the adding scenario presents the possibility for the same hashed data item 329 to be represented, unnecessarily, in the reference hash set 328 multiple times (in the hash set creation scenario, the hash set is new and thus not yet populated with any hashed data items 329).

To address the possibility for duplicate hashed data items 329, the adding module 336 is configured to execute a hash comparison module 348. The hash comparison module 348 may function similarly to the hash comparison module 314. The hash comparison module 348 may be the same module as the hash comparison module 314 such that both the forensic data review application 306 and the hash set management module 330 use the same hash comparison module 314. The hash comparison module 348 may be a component of or called by the adding module 336. The hash comparison module 348 is configured to compare an output (hash value 334) of the hashing module 338 to the hash values 334 in the reference hash set 328 and determine whether there is a match. If there is a match, the newly generated hashed data item 329, which was to be added via the adding module 336, is deleted (and not added to the hash set 328). This can prevent unnecessary duplication in the reference hash set 328.

In an embodiment, a user input in the form of a "right click" selection of a data item 320 may be received at the communication interface 350, communicated to the client-side software module 308 and/or further communicated to the server-side software module 310. According to instructions received from either or both of the client-side software module 308 and/or the server-side software module 310, the display 352 may further be configured to generate a selectable element (e.g., a "pop-up menu") configured to receive further user input (e.g., a "left click" of an option from among a list of options in the pop-up menu). Accordingly, a user may thus "right click" on a data item 320 in the FDRUI 354 and have an "add to hash set" option presented as a selectable element (e.g. a pop-up menu or window may be displayed) to addition to the hash set in the system 300.

The hash set management module 330 further includes a tagging module 346. The tagging module 346 may be executed by the hash creator module 331 when adding a first hashed data item 329 to the newly created reference hash set 328. The tagging module 346 may be executed by the adding module 336 upon determining, via the hash comparison module 348, that there is no duplicate hashed data item 329 already in the reference hash set 328 and that the new hashed data item should be added.

The tagging module 346 is configured to generate a tag and link or associate the tag with a hashed data item 329 in the reference hash set 328. The tag is stored as hash categorization data 340. The hash categorization data 340 is stored in memory 304.

Generally, hash categorization data 340 is used to categorize a hashed data item 329 into a predefined category, where the category indicates how a data item 320 whose hash value matches the hash value 334 of that hashed data item 329 is to be presented or displayed in the FDRUI 354. Generally, the category represents a change in how such a data item 320 is to be presented or displayed as compared to a default presentation in the FDRUI 354 (as described herein).

The hash categorization data 340 includes presentation rules 342 specific for a particular data item 320. Presentation rules 342 for a given hashed data item 329 include encoded rules indicating how a data item 320 whose hash value matches the hash value 334 of that given hashed data item 329 is to be presented or displayed in the FDRUI 354. The forensic data review application 306 is configured to read the presentation rules 342 and display the hash-matching data item 320 in the FDRUI 354 according to the presentation rules 342 (e.g. via presentation module 356, described below). The presentation rules 342 may be stored as properties or attributes of hashed data items 329, and potentially as properties or attributes of data items 320 in the forensic data collection 318.

Presentation rules 342 may be predefined in the sense that a particular predefined tag or categorization may correspond with the automatic application of certain presentation rules 342. In this sense, presentation rules 342 may be automatically generated upon selection by a user of a particular tag.

The hash categorization data 340 also includes metadata 344. Metadata 344 includes data about the hashed data item 329. Metadata 344 may include a creator of the hashed data item 329. Metadata 344 may include descriptive data indicating why the hashed data item 329 was added to the reference hash set 328 or why a certain tag was applied to the hashed data item 329. Presentation rules 342 and/or metadata 344 may be displayed in the FDRUI 354 along with a data item 320 whose hash value matches a hash value 334 in the reference hash set 328.

Examples of categories or tags will now be described. As noted, such categories or tags may be predefined and displayed as user-selectable tags in a tagging interface (e.g., pop-up menu or the like) in the FDRUI 354 that, upon selection, are applied to the corresponding hashed data item 329. The tagging interface may be generated by the server-side module 310 and sent to the client-side module 308 for display in a human-readable format via the display 352.

The categories or tags may be designed to address certain situations commonly faced by forensic examiners when conducting digital forensic investigations. Generally, the tags may be used to encode knowledge or conclusions of a first user about certain forensic data that can be used to affect subsequent display of that forensic data to the first user or other users, thereby increasing review efficiency.

In a first example, the hash categorization data 340 may include an "include" tag. The "include" tag, when applied to a hashed data item 329, is used to mark a data item 320 whose hash value matches the hash value 334 of that hashed data item 329 as having relevance to that forensic investigation or other forensic investigations. Generally, the "include" tag is used to note, in the FDRUI 354, that a data item 320 is important and should be reviewed.

In another example, the hash categorization data 340 may include an "include but modify" tag. The "include but modify" tag, when applied to a hashed data item 329, is used similarly to the "include" tag but will cause a data item 320 whose hash value matches the hash value 334 of the hashed data item 329 to have its contents be displayed in a modified format, such as described herein. In a particular example, the modified format may be a blurring of an image or portion thereof. In the case of "include but modify", the data item 320 is relevant but it is not desirable to have other users view the content of data item 320 or the same user review the content of the data item 320 more than once. An "include but modify" tag may include further instructions to perform further modifications in addition to or instead of blurring the data item 320, for example greyscaling or depixelating the data item 320. An "include but modify" tag may include instructions to redact all or part of the data item 320 or cause only a portion of the data item 320 to be displayed.

In another example, the hash categorization data 340 may include an "exclude" tag. The "exclude" tag, when applied to a hashed data item 329, is used to mark a data item 320 whose hash value matches the hash value 334 of that hashed data item 329 as not having relevance to that forensic investigation (and potentially other forensic investigations). Generally, the "exclude" tag is used to note, in the FDRUI 354, that a data item 320 is not important and should not be reviewed. In some cases, the "exclude" tag may cause the corresponding data item 320 to not be displayed at all in the FDRUI 354. In other cases, the data item 320 may be displayed in the FDRUI 354 in such a way as to indicate that the data item 320 is not relevant and/or does not need to be reviewed.

An "exclude" tag may be associated with one or more scopes. For example, the "exclude" tag may indicate that the data item 320 should be marked to avoid further review by other forensic examiners reviewing the same forensic data collection 318. Such a marking may not affect whether the data item 320 is available for review to other forensic examiners in a different forensic data collection 318 in the same forensic repository 316. In a further example, the "exclude" tag may indicate that the data item 320 should be marked to avoid further review by other forensic examiners in the same forensic repository 316. In a still further example, the "exclude" tag may indicate that the data item 320 should be marked to avoid further review by other forensic examiners in all circumstances (i.e., any forensic examiner using the forensic data review application 306), for example where the quality of the data item 320 is so low as to frustrate forensic examination.

A scope of the "exclude" tag may be configured by the user selecting the "exclude" tag. This may include, for example, selecting among a list of predefined scopes. Such predefined scopes may be displayed in the tagging interface upon receiving a selection of the "exclude" tag. In an example, a scope may be "exclude, for all fraud-type investigations", where display of the data item 320 will be varied for any fraud-type investigation (whether an investigation is of a fraud-type would be stored by the system in forensic repository 316) but not for investigations of other types (e.g., child exploitation, assault, drug trafficking, corporate offences/investigations). In cases where a hashed data item 329 has multiple overlapping scopes associated therewith, further presentation rules may define precedence as between tags of overlapping scopes.

Display of data items 320 in FDRUI 354 using the reference hash set 328 will now be described. It should be noted that the FDRUI 354 may be configured to display forensic data in a plurality of formats, some of which may be initiated by user input, and as such may include a plurality of different user interface screens depending on the data selected for display.

Referring again to the forensic data review application 306, the forensic data review application 306 includes the hash comparison module 314 and the presentation module 356.

The forensic data review application 306 may execute the hash comparison module 314 when displaying a forensic data collection 318 or subset thereof in the FDRUI 354.

The hash comparison module 314 is configured to execute a hashing module (not shown). The hashing module may be hashing module 338 or may function similarly thereto. The hashing module generates a hash value of at least one data item 320 in the forensic data collection 318 that is to be displayed. In some cases, a hash value for each data item 320 in the forensic data collection 318 to be displayed may be generated. In some cases, the generation of the hash value for each data item 320 in the forensic data collection 318 to be displayed may be automatic. The hash value generated is similar to hash values 334 in the reference hash set 328.

Once the hash value of the at least one data item 320 in the forensic data collection to be displayed is generated, the hash comparison module 314 is configured to compare that hash value to the hash values 334 in at least one reference hash set 328 in the reference hash set database 326 to determine if there is a match. In some cases, the hash value may be compared to the hash values 334 in each reference hash set 328 in the hash set database 326. The reference hash sets 328 used for comparison may be determined automatically based on data stored in reference hash database 326, which may have been provided to the system 300 by a forensic examiner at time of creation or at another time. In other cases, the forensic examiner may select via the FDRUI 354 that one or more reference hash sets 328 should be used.

If there is no match determined by the hash comparison module 314, the presentation module 356 is configured to generate a FDRUI 354 wherein the at least one data item 320 is displayed according to "default" presentation rules. As further described herein, "default" presentation rules refer to rules applied by the forensic data review application 306 on how forensic data, including the at least one data item 320, is to be displayed in the FDRUI 354 when not changed or varied by the hash categorization data 340. For example, the "default" presentation rules would dictate how forensic data is displayed in the FDRUI 354 prior to the creation of any reference hash set 328.

If there is a match determined by the hash comparison module 314, the presentation module 356 is configured to read the corresponding hash categorization data or tag 340, and in particular the presentation rules 342, of the matching hashed data item 329 in the reference hash set 328 and generate a FDRUI 354 in which the at least one data item 320 that has a match in the reference hash set 328 is displayed according to the presentation rules 342. In this sense, the presentation module 356 varies or changes how the at least one data item 320 is displayed in the FDRUI 354 based on the presentation rules 342, which instruct the presentation module 356 how to present the at least one data item 320 that has the matching hash value. For example, if the categorization data 340 includes an "exclude" tag, the presentation rules 342 may specify to not display the at least one data item 320 in the FDRUI 354 or display the at least one data item 320 with an icon indicating it is not relevant for review. In another example, if the categorization data 340 includes an "include" tag, the presentation rules 342 may specify to display metadata and/or contents of the at least one data item 320 in a list with a heading of "For Review" or the like.

In some embodiments, as further described herein, the presentation rules 342 are linked to the data item itself from which the hashed data item 329 was generated, for example via the common file identifier 332, such that the same instance of the data item can be displayed in the FDRUI 354 according to the presentation rules 342 without having to perform a hash comparison. Such an approach would apply only to the same instance of the data item and not to other instances (or copies) of that data item, as such other instances would still be hashed to determine whether they are a match.

Figure 4A:
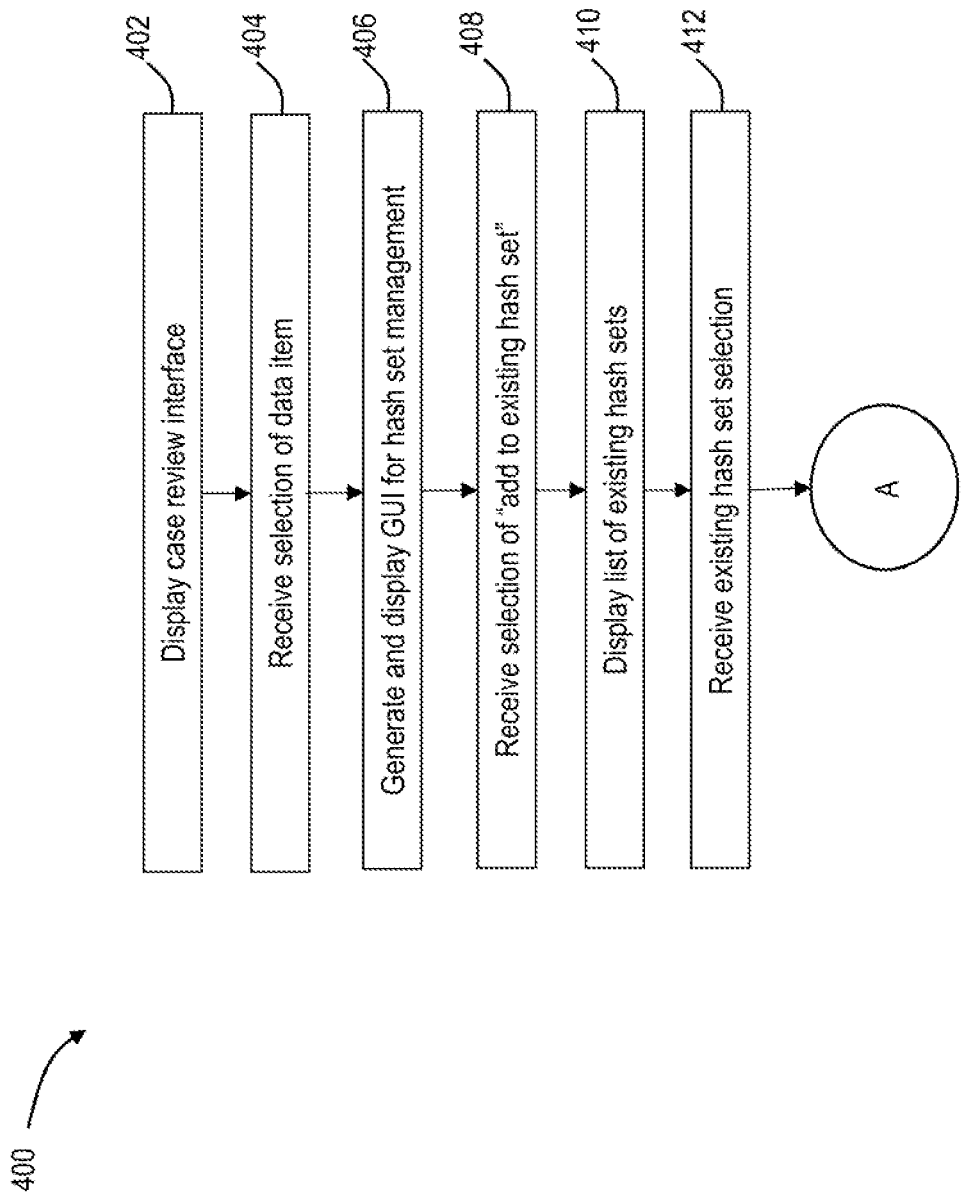
FIGS. 4A and 4B are a flow diagram of a method of adding to an existing reference hash set for forensic data presentation and review, according to an embodiment.
Figure 4B:
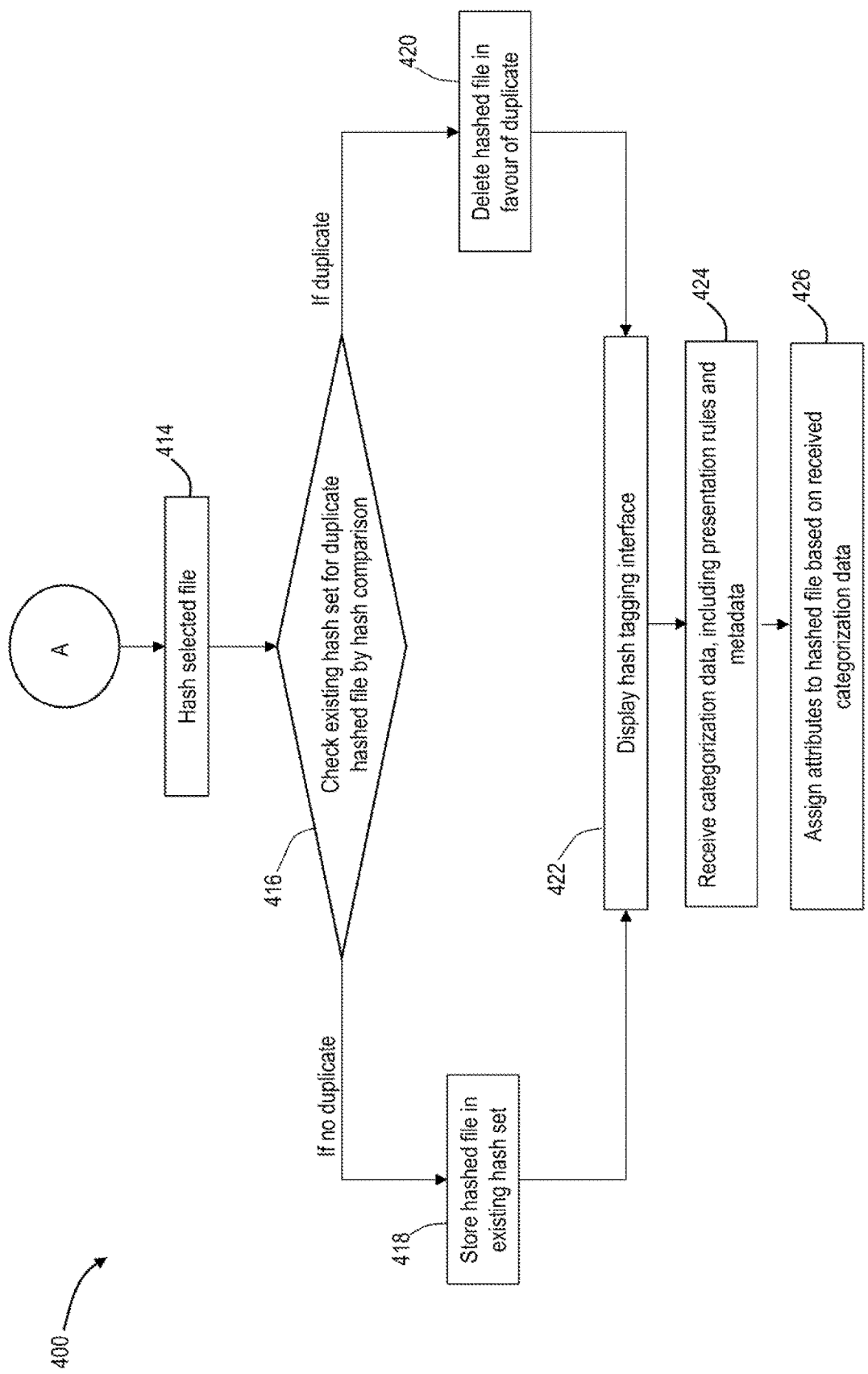

Referring now to FIGS. 4A and 4B, shown therein is a flow diagram of a method 400 for adding a data item 320 to an existing reference hash set 328 for forensic data presentation and review, according to an embodiment. The data item 320 is stored in a forensic data collection 318. The method 400 may be used to add a hashed version of a data item to a reference hash set to simplify subsequent review of forensic data in a forensic data review user interface.

The method 400 may be encoded as computer-executable instructions that, when executed by a processor of a computing device (such as the processor 302), cause the computing device to perform the various steps of the method 400. The method 400 may be implemented by the computer system 300 of FIG. 3. In particular, the method 400 or a portion thereof may be implemented by the adding module 336 of FIG. 3.

At 402, the method 400 includes generating and displaying a forensic data review user interface (FDRUI) 354 at the display 352. The FDRUI 354 may be a case review interface for reviewing various data about a particular case or forensic investigation stored by the system.

The FDRUI 354 displays data items 320 from a forensic data collection 318. The FDRUI 354 may be configured with default presentation rules for displaying data items 320 in the forensic data collection 318. For example, the default presentation rules may specify that all data items 320 in the forensic data collection 318 are to be displayed in the FDRUI 354 or may specify that data items 320 are to be displayed in a particular way.

The displayed FDRUI 354 is configured to receive a user input from a user interacting with the input device 357.

At 404, the method 400 includes receiving a selection of a data item 320a for adding to the hash set 328. The selection may be received via the FDRUI 354. Input data may be generated by the processor 302 in response to the user input received at the FDRUI 354.

At 406, the method 400 includes generating and displaying a graphical user interface (GUI) for hash set management at the display 352 in response to the selection of the data item 320a at 404.

For example, a user input in the form of a "right click" selection of the data item 320a displayed in the FDRUI 354 may be received via user interaction with FDRUI 354. The selection may be received as user input via the input device 357. According to instructions received from either or both of the client-side software module 308 and/or the server-side software module 310, the display 352 displays the GUI.

The GUI may include a selectable element (e.g., a "pop-up menu") configured to receive further user input (e.g., a "left click" of an option from among a list of options in the pop-up menu). The GUI may be a pop-up window and/or another user interface element in the FDRUI 354. The GUI may be a user interface separate to the FDRUI 354. The GUI includes a selectable element indicating "add to existing hash set".

At 408, the method 400 further includes receiving a selection of "add to existing hash set" via user interaction with the GUI generated and displayed at 406.

At 410, the method 400 further includes displaying a list of existing reference hash sets 328 from the reference hash database 326.

The FDRUI 354 may display a unique hash set identifier 327 for each existing reference hash set 328 (e.g., a number or text string).

Data items 320 corresponding to hash values 334 of hashed data items 329 of the reference hash sets 328 may be displayed to or may be selectable by the user. Accordingly, a user may be able to effectively browse through existing reference hash sets 328 in order to select the appropriate reference hash set 328 to which a hashed version of the selected data item 320a is to be added.

At 412, the method 400 further includes receiving a selection of an existing reference hash set 328 via the FDRUI 354.

At 414, the method 400 further includes hashing the selected data item 320a to generate a hashed data item 329a.

At 416, the method 400 further includes checking the existing reference hash set 328 selected at 412 for a duplicate of the hashed data item 329a by performing a hash comparison.

Specifically, the hash value 334a of the newly created hashed data item 329a is compared with the hash value 334 of each hashed data item 329 already present in the existing reference hash set 328 selected at 412 to determine whether the newly hashed data item 329a is already represented (i.e., whether there is a duplicate of the selected data item 320a as hashed) in the selected existing reference hash set 328.

If, at 416, no duplicate of the newly created hash value 334a is identified, the method 400 proceeds to 418.

At 418, the method 400 further includes storing the hashed data item 329a in the selected existing reference hash set 328. Specifically, the hash value 334a is stored in the selected existing reference hash set 328 and a file identifier 332a is generated and assigned to the hash value 334a now stored in the selected existing reference hash set 328. The file identifier 332 identifies the data item 320 that was hashed, such that the hash value 334*a* is linked to the data item 320*a* from which the hashed data item 329*a* was generated.

If, at 416, a duplicate of the newly created hash value 334*a* is identified, the method 400 proceeds to 420.

At 420, the method 400 further includes deleting the newly hashed data item 329*a* in favour of the duplicate hashed data item 329*a* already present in the selected existing reference hash set 328.

In an embodiment, the duplicate hashed data item 329*a* already present in the selected existing reference hash set 328 is instead deleted in favour of the newly hashed data item 329*a*, and the newly hashed data item 329*a* is stored in the selected existing reference hash set 328 as described in relation to 418.

At 422, the method 400 further includes generating and displaying a tagging interface. The tagging interface may be used to apply categorization data, including presentation rules 342, to the hashed data item 329. In some cases, the categorization data may function as a "tag".

The tagging interface may be displayed in the FDRUI 354. The displayed tagging interface is configured to receive a user input from a user interacting with the FDRUI 354. Another version of the tagging interface may then be generated based on the input data received via the FDRUI 354.

The tagging interface may display a plurality of predefined "tags" that can be selected to apply to the hashed data item 329. In some cases, the tagging interface may allow a user to configure or define a tag or categorization data through user input.

At 424, the method 400 further includes receiving hash categorization data 340 (or tagging data 340) via the tagging interface based on a user input.

The tagging data 340 includes presentation rules 342 and metadata 344. In some cases, a predefined tag may have predefined presentation rules 342 associated with the tag such that selection of the tag in the user interface automatically causes the presentation rules 342 to be applied without the user specifically configuring or selecting the presentation rules 342. In other cases, the user may configure or select the presentation rules 342.

At 426, the method 400 further includes assigning at least one attribute to the hashed data item 329 based on the categorization data received at 424.

Assigned attributes of the hashed data item 329 may function to specify or vary at least one display property of the corresponding data item 320 in the FDRUI 354. For example, the assigned attribute may vary a display property from a "default" display property. Doing so may enable display properties of the data item 320 in the FDRUI 354 to be varied across multiple forensic investigator users (or the same forensic investigator user across different points in time) and/or across multiple forensic data collections 318 and/or across multiple forensic repositories 316 and/or across multiple forensic investigations.

For example, if the categorization data received at 424 includes an "include" tag, the presentation rules 342 associated with the "include" tag may be encoded to the data item 320 and to other instances of the same data item 320 (wherein "same" here refers to two data items 320 having matching hash values 334). The other instances of the same data item 320 may be present in the same forensic data collection 318 or in a different forensic data collection 318, may be present in the same forensic repository 316 or in a different forensic repository 316, and/or may be present in the same forensic investigation or in a different forensic investigation.

Figure 5A:
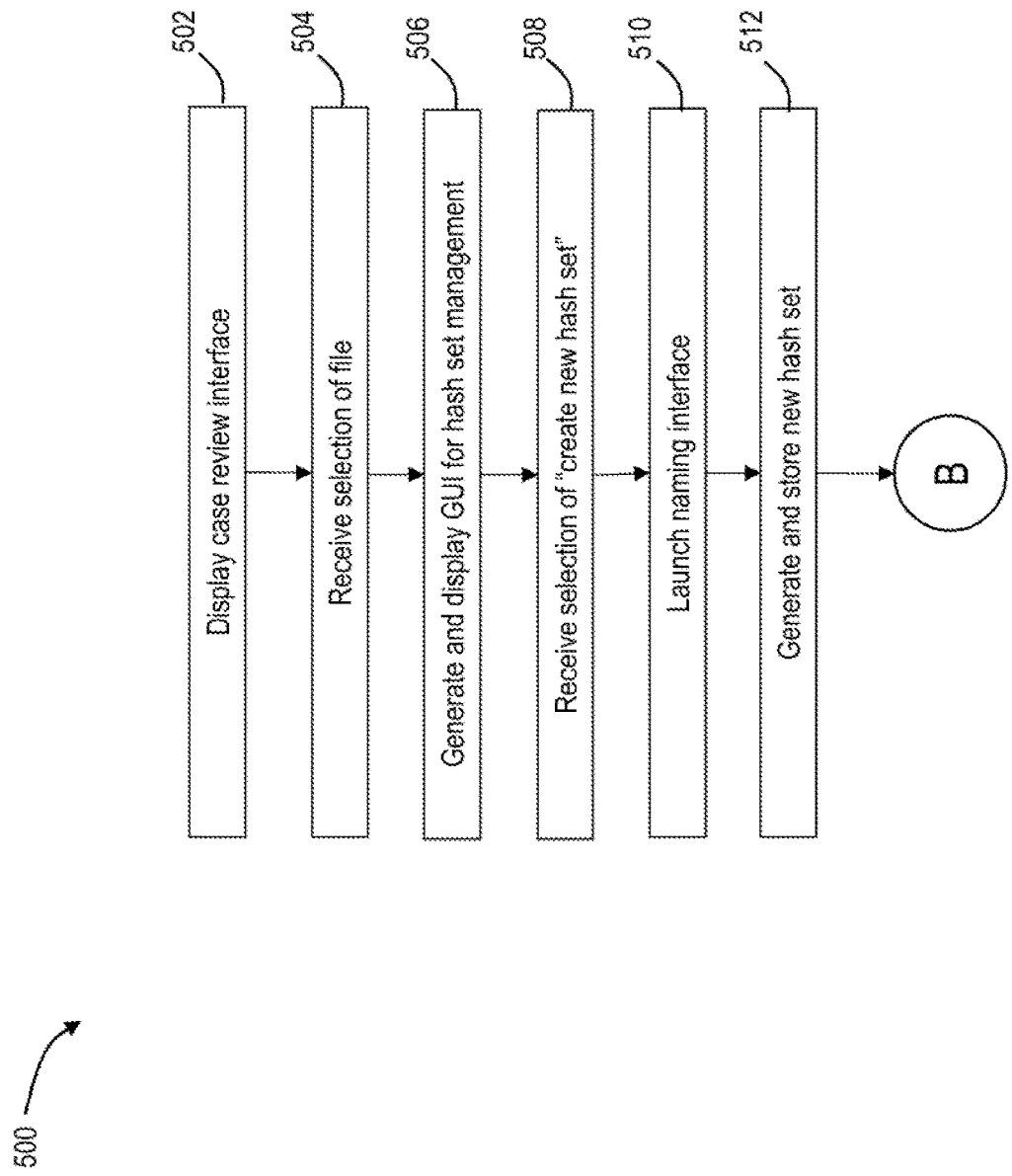
FIGS. 5A and 5B are a flow diagram of a method of generating a reference hash set for forensic data presentation and review in a forensic data review user interface, according to an embodiment.
Figure 5B:
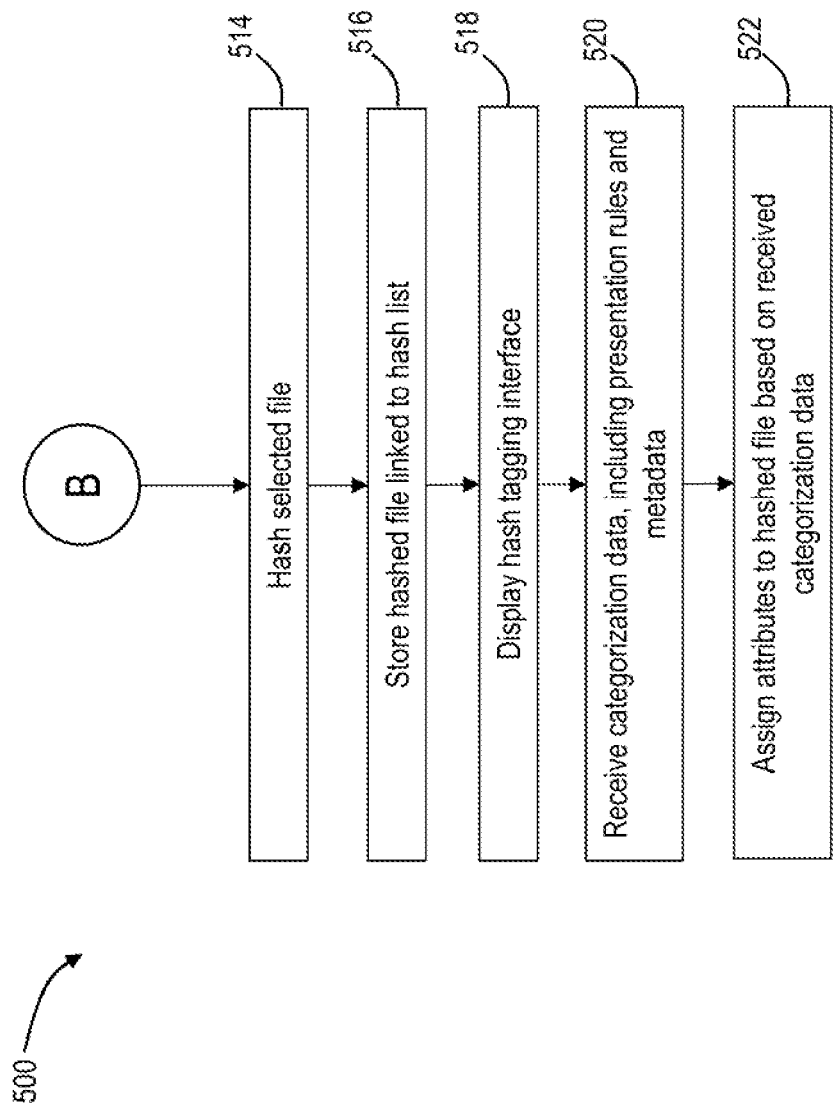

Referring now to FIGS. 5A and 5B, shown therein is a flow diagram of a method 500 for generating a reference hash set 328 for forensic data presentation and review in a forensic data review user interface (FDRUI) 354, according to an embodiment. The method 400 may be used to add a hashed version of a data item 320 to a reference hash set 328 to simplify subsequent review of forensic data in the FDRUI 354.

The method 500 may be encoded as computer-executable instructions that, when executed by a processor of a computing device (such as the processor 302), cause the computing device to perform the various steps of the method 500. The method 500 may be implemented by the computer system 300 of FIG. 3. In particular, the method 500 or a portion thereof may be implemented by the hash set creator module 331 of FIG. 3.

At 502, the method 500 includes generating and displaying a forensic data review user interface (FDRUI) 354 at the display 352. The FDRUI 354 may be a case review interface for reviewing various data about a particular case or forensic investigation stored by the system 300.

The FDRUI 354 displays data items 320 from the forensic data collection 318. The FDRUI 354 may be configured with default presentation rules for displaying the data items 320 in the forensic data collection 318. For example, the default presentation rules may specify that all data items 320 in the forensic data collection 318 are to be displayed in the FDRUI 354 or may specify that the data items 320 are to be displayed in a particular way.

At 504, the method 500 includes receiving a user selection of a data item 320*a* for hashing. The selection may be received via the FDRUI 354. Input data may be generated by the processor 302 in response to the user input received at the FDRUI 354. Another version of the FDRUI 354 may then be generated based on the input data so received.

At 506, the method 500 includes generating and displaying a graphical user interface (GUI) for hash set management at the display 352 in response to the user input received at the FDRUI 354.

For example, a user input in the form of a "right click" selection of a data item 320*a* displayed in the FDRUI may be received via a user interaction with the FDRUI 354. The selection may be received as user input via the input device 357. According to instructions received from either or both of the client-side software module 308 and/or the server-side software module 310, the display 352 may display the GUI.

The GUI may include a selectable element (e.g., a "pop-up menu") configured to receive further user input (e.g., a "left click" of an option from among a list of options in the pop-up menu). The GUI may be a pop-up window and/or another user interface element in the FDRUI 354. The GUI may be a user interface separate to the FDRUI 354. The GUI includes a selectable element indicating "create new reference hash set".

At 508, the method 500 further includes receiving a selection of "create new hash set" via user interaction with the GUI generated and displayed at 506.

At 510, the method 500 further includes launching a naming interface via the FDRUI 354 in response to the selection received at 508. The naming interface may be configured to receive a name to be associated with the newly created reference hash set 328 in the hash database 326. The name may be the hash set identifier 327 or may be used by the system to generate the hash set identifier 327.

At 512, the method 500 further includes generating a new reference hash set 328 according to the information received via the naming interface. The newly generated reference hash set 328 is stored in the reference hash database 326. Generating and storing the newly generated reference hash set 328 includes assigning the hash set identifier 327 to the newly generated reference hash set 328.

At 514, the method 500 further includes hashing the selected data item 320a to generate a corresponding hashed data item 329a.

At 516, the method 500 further includes storing the hashed data item 329a generated at 514 in the newly generated reference hash set 328. Specifically, the hash value 334a is stored in the newly generated reference hash set 328 and a file identifier 332a is generated and assigned to the hash value 334a now stored in the newly generated reference hash set 328. The file identifier 332a identifies the data item 320a that was hashed, such that the hash value 334a is linked to the data item 320a from which the hash value 334a was generated.

At 518, the method 500 further includes generating and displaying a tagging interface for receiving categorization data 340 (e.g., a tag 340) for the newly hashed data item 329a.

The tagging interface may be displayed at the FDRUI 354. The displayed tagging interface is configured to receive a user input from a user interacting with the FDRUI 354. Another version of the tagging interface may then be generated based on the input data received via the FDRUI 354.

The tagging interface may display a plurality of pre-defined tags that can be selected to apply to the hashed data item 329a. In some cases, the tagging interface may allow the user to configure or define a tag or categorization data 340 through user input.

At 520, the method 500 further includes receiving hash categorization data 340 (or tagging data 340) via the tagging interface based on a user input.

The received tagging data 340 includes presentation rules 342 and metadata 344. In some cases, a predefined tag may have predefined presentation rules 342 associated with the tag such that selection of the tag in the user interface automatically causes the presentations rules 342 to be applied without the user specifically configuring or selecting the presentation rules 342. In other cases, the user may configure or select the presentation rules 342.

At 522, the method 500 further includes assigning at least one attribute to the hashed data item 329a based on the categorization data received at 520, such as described at 426 of FIG. 4.

Figure 6A:
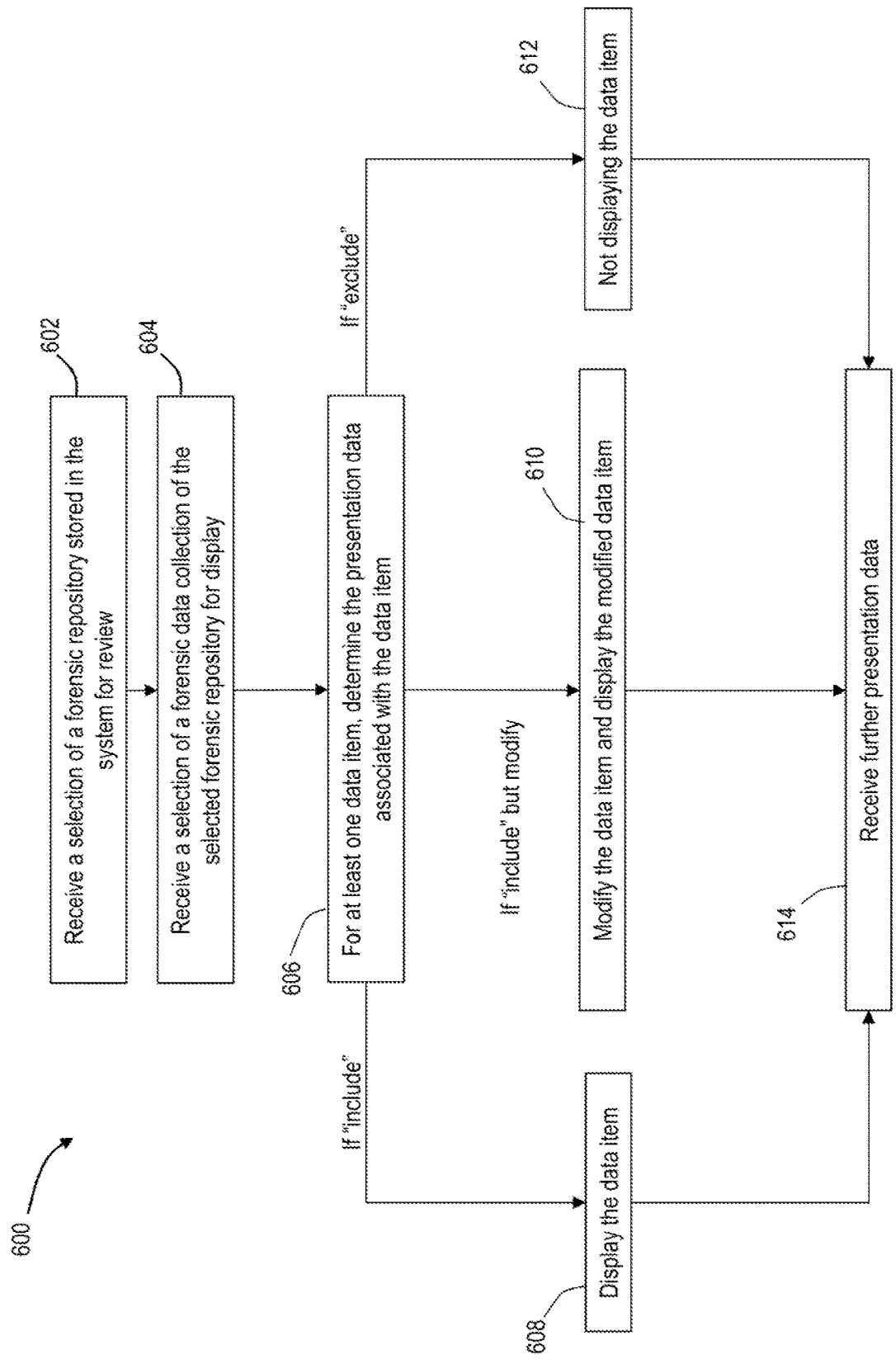
FIG. 6A is a flow diagram of a method of displaying forensic data in a user interface based on presentation rules tagged in a reference hash set, according to an embodiment.

Referring now to FIG. 6A, shown therein is a flow diagram of a method 600 for displaying forensic data in a forensic data review user interface based on presentation rules tagged in a reference hash set, according to an embodiment. The method 600 may simplify forensic data review through automatically varying a display property of a data item in a forensic data collection using the reference hash set.

The method 600 may be encoded as computer-executable instructions that, when executed by a processor of a computing device (such as the processor 302), cause the computing device to perform the various steps of the method 600. The method 600 may be implemented by the computer system 300 of FIG. 3. In particular, the method 600 or a portion thereof may be implemented by the presentation module 356 of FIG. 3.

At 602, the method 600 includes receiving a selection of a forensic repository 316 for review via the FDRUI 354. The selection may be received at the client-side software module 308 and transmitted to the server-side software module 310. The selection may cause a FDRUI 354 for the selected forensic repository to be generated and displayed.

At 604, the method 600 further includes receiving a selection of a forensic data collection 318 within the forensic repository 316 for display via the FDRUI 354. The selection may be received at the client-side software module 308 and transmitted to the server-side software module 310.

At 606, the method 600 further includes, for at least one data item 320a in the forensic data collection selected at 604, determining and applying the presentation rules 342a associated with the at least one data item 320a.

In some embodiments, 606 is performed for each data item 320 in the selected forensic data collection 318. Each data item 320 in the selected forensic data collection 318 is automatically hashed and compared in order to facilitate determining and applying the presentation rules 342 associated with each data item 320. In an embodiment, the forensic examiner selects to automatically hash each data item 320 in the selected forensic data collection 318 before reviewing, (e.g., a "left click" of an option from among a list of options in the FDRUI 354).

At 608, if the presentation rules 342a determined at 606 corresponds to an "include" tag, the method 600 further includes displaying the data item 320a in the user interface.

At 610, if the presentation rules 342a determined at 606 correspond to an "include but modify" tag, the method 600 further includes modifying the data item 320a and displaying the modified data item 320a.

In an embodiment, at 610, the modification and display include a temporary modification of the data item 320a according to the presentation rules 342a and display of the temporarily modified data item 320a.

At 612, if the presentation rules 342a determined at 606 correspond to an "exclude" tag, the method 600 further includes not displaying the data item 320a in the FDRUI 354.

Optionally, at 614, the presentation module 356 may receive further presentation rules 342 or tags 340 via the FDRUI 354. In an embodiment, further tags 340 beyond the examples described herein are provided. The further tags 340 may be pre-defined tags displayed in the FDRUI 354. The pre-defined tags may be pre-defined by the system 10 and/or may be pre-defined for the forensic repository 316, for the forensic data collection 318, for the reference hash database 326, for a forensic investigation, and/or otherwise. The further tags 340 may be user-defined tags defined on an ad hoc basis by a forensic examiner. The further tags 340 may include both pre-defined tags and user-defined tags, e.g., the FDRUI 354 may provide a selection of pre-defined tags at 614 and provide the forensic examiner with the option to define further tags (e.g., a "left click" of an option and an input field configured to receive details of newly created user-defined tags, such as a name and a modified presentation rule 342).

In an embodiment, the method 600 further includes receiving updated presentation rules 342 and/or tags 340 from a user via the FDRUI 354. For example, a forensic examiner user may change the tag 340 associated with the data item 320a from an "include" tag to an "include but modify" tag. In another example, a forensic examiner user may change the presentation rules 342a associated with all or part of a forensic data collection 318 to indicate that any data items 320 associated with an "include but modify" tag should instead be included or excluded when reviewed by particular forensic examiners.

Figure 6B:
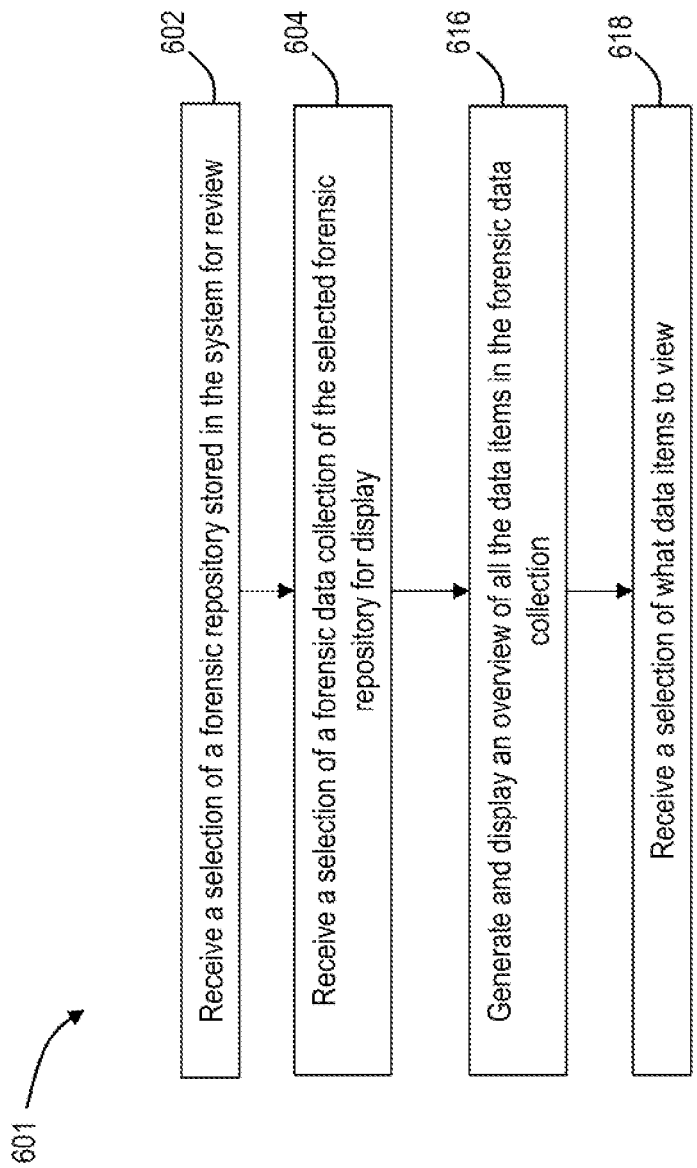
FIG. 6B is a flow diagram of a method of displaying forensic data in a user interface based on presentation rules tagged in a reference hash set, continuing from FIG. 6A, according to an embodiment.

Referring now to FIG. 6B, shown therein is a flow diagram of a method 601 for displaying forensic data in the FDRUI 354 based on presentation rules 342 applied in a reference hash set 328, according to an embodiment.

At 602, the method 601 includes receiving a selection of a forensic repository 316 for review via the FDRUI 354. The selection may be received at the client-side software module 308 and transmitted to the server-side software module 310.

At 604, the method 601 further includes receiving a selection of a forensic data collection 318 within the forensic repository 316 for display via the FDRUI 354. The selection may be received at the client-side software module 308 and transmitted to the server-side software module 310.

At 616, the method 601 further includes generating and displaying an overview of all the forensic data items 320 in the forensic data collection 318.

The data items 320 may be displayed alongside the presentation rules 342 and/or tags 340 associated with each data item 320.

For example, a first data item may be displayed alongside an "include" tag, while a second data item may be displayed alongside an "include but modify" tag, and a third data item may be displayed alongside an "exclude tag".

Accordingly, via the method 601, a forensic examiner user may advantageously see an overview (e.g., a title, a section of the data item 320a, a smaller version of the data item 320a) displayed alongside the tags 340 and associated presentation rules 342 as provided by the same or other forensic examiners reviewing the same or different forensic data collections 318 or forensic repositories 316 and/or in the context of different forensic investigations.

At 618, the method 601 further includes receiving a selection of data items in the overview displayed at 616 to be displayed in greater detail in the FDRUI 354 and displaying the selected data items in greater detail in the FDRUI 354.

For example, a forensic examiner user may click on one of the data items 320a displayed alongside the presentation rules 342 to view the data item 320a in more detail and/or to review the data item 320a.

If the forensic examiner user clicks on a data item 320a associated with an "exclude" tag, a message may be displayed (for example, via a pop-up window) asking the user to confirm their selection of the excluded data item 320a.

If the forensic examiner users clicks on or otherwise selects a data item 320a associated with an "include but modify" tag, the data item 320a may be displayed alongside an option (for example, a button in the FDRUI 354) allowing the user to override or undo the modification to the copy of the data item 320a in order to review the original data item 320a. Optionally, the user may be able to select to view the original data item 320a despite an "include but modify" tag from the overview of the data items 320 provided at 616. If the forensic examiner user selects to view the original data item 320a despite the "include but modify" tag, a message may be generated and displayed (for example, via a pop-up window) asking the user to confirm their selection to view the original data item 320a despite the "include but modify" tag.

Figure 7:
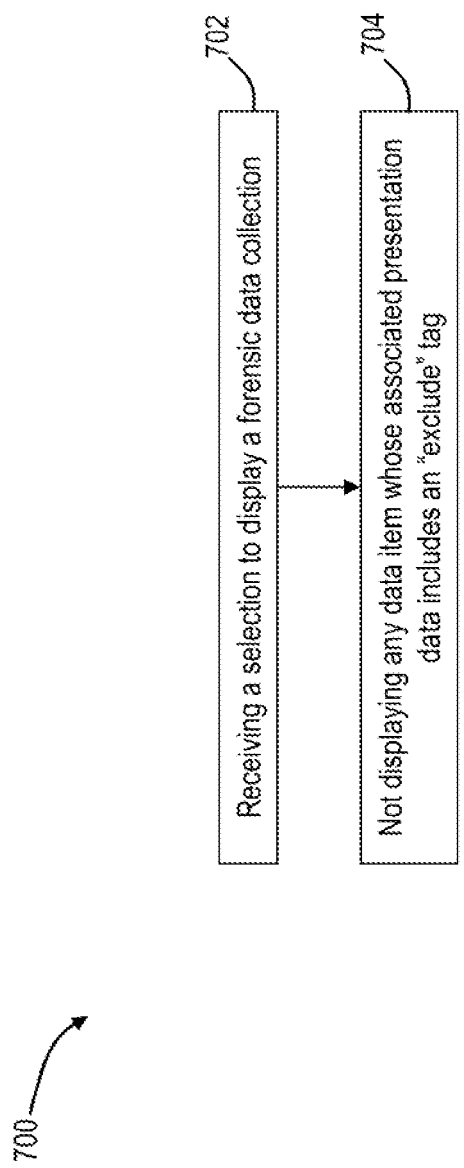
FIG. 7 is a flow diagram of a method of adding a hash of a file to be excluded from review to a reference hash set and displaying the file based on hash presentation rules in a forensic data review user interface, according to an embodiment.

Referring now to FIG. 7, shown therein is a flow diagram of a method 700 of adding a hashed data item 329a that is to be excluded from review to a reference hash set 328 and displaying the corresponding data item 320a based on hash presentation rules 342a in a forensic data review user interface, according to an embodiment.

The method 700 may be encoded as computer-executable instructions that, when executed by a processor of a computing device (such as the processor 302), cause the computing device to perform the various steps of the method 700. The method 700 may be implemented by the computer system 300 of FIG. 3. In particular, the method 700 or a portion thereof may be implemented by the presentation module 356 of FIG. 3.

The reference hash set 328 may have been generated according to the method 400. Categorization data 340 associated with the hashed data item 329a to be added includes an "exclude" tag.

At 702, the method 700 includes receiving a selection of a forensic data collection 318 for display via the FDRUI 354. The selection may be received at the client-side software module 308 and transmitted to the server-side software module 310. The selected forensic data collection 318 is displayed in the FDRUI 354 at the display 352 (i.e., all data items 320 of forensic data collection 318 are displayed according to the presentation rules 342).

At 704, the presentation module 356 instructs the display 352 not to display any data item 320 whose associated presentation data 340 includes an "exclude" tag. Because the categorization data 340 associated with the data item 320a includes the "exclude" tag, the presentation module 356 instructs the display 352 not to display the data item 320a according to the presentation rules 342.

In an embodiment, not displaying the data item 320a whose associated categorization data 340 includes the "exclude" tag includes drawing attention to other data items 320. Drawing attention to the other data items 320 may include presenting the other data items 320 among a list of data items 320 to review. Drawing attention to the other data item 320s may include displaying a pop-up window whose content includes the other data items 320 but does not include any data item 320 whose associated categorization data 340 includes the "exclude tag". Not displaying the data item 320 whose associated categorization data 340 includes the "exclude" tag may include displaying the presentation rules 342, the tags 340, the metadata 344 associated with the data item 320a, and/or other metadata including any one or more of hash metadata, a creator, and descriptive data in respect of the data item 320a whose associated categorization data 340 includes the "exclude" tag. The descriptive data may include a text string or the like specifying one or more reason(s) for applying the "exclude" tag to the hashed data item 329a.

In an embodiment, all data items 320 are listed in a window or menu for selection by the user. Those data items 320 associated with an "exclude" tag have a visible symbol (e.g., a coloured icon, such as a dot) indicating the "exclude" tag. The visible symbol may be displayed along with metadata of the data item (e.g., file identifier, other metadata such as size, file, or artifact type).

In an embodiment, the "exclude" tag is advantageously used to save computer resources in not displaying data items 320 previously tagged for exclusion and/or considered irrelevant. Furthermore, time of forensic examiners may be saved in the system not displaying and therefore not causing review of such "excluded" data items 320 by forensic examiners. Where forensic examiners would need to review data items 320 otherwise associated with an "exclude" tag, the system implementing the FDRUI 354 (such as the system 10 of FIG. 1) would waste computer resources associated with the "excluded" data items 320 in displaying those "excluded" data items 320 for review by a forensic examiner. Furthermore, without excluding irrelevant data items from review as described, forensic examiners may otherwise waste time in reviewing those irrelevant data items 320. Upon reviewing a data item 320 on a first occasion and determining its irrelevance, a forensic examiner may cause the system 10 to perform the method 700 to exclude the corresponding hashed data item 329 from further presentation.

Figure 8:
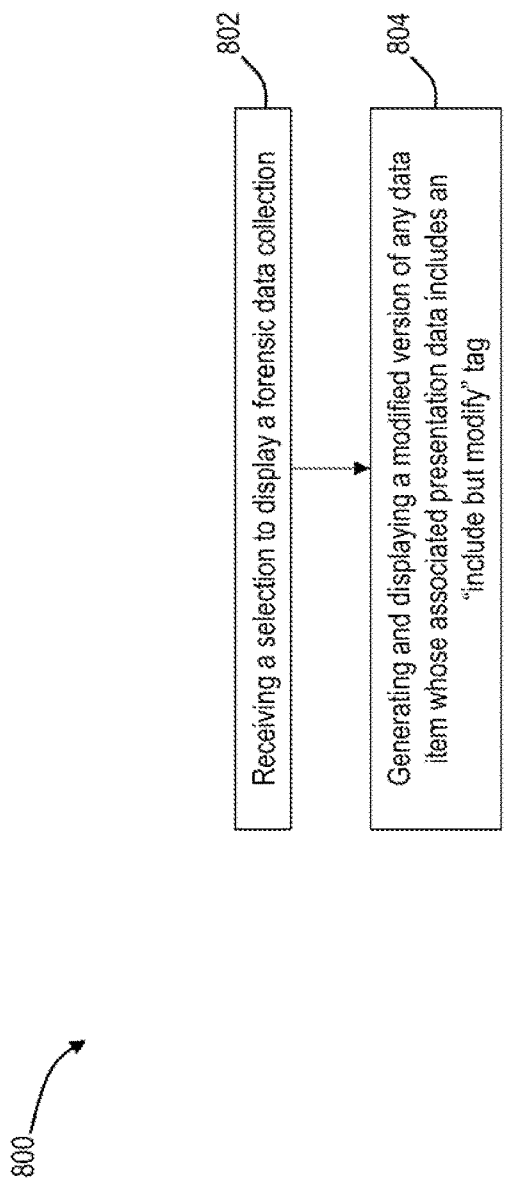
FIG. 8 is a flow diagram of a method of adding a hash of a file to be included but modified in review to a reference hash set and displaying the file based on hash presentation rules in a forensic data review user interface, according to an embodiment.

Referring now to FIG. 8, shown therein is a flow diagram of a method 800 of adding a hashed data item 329a to be included but displayed in a modified fashion for review to a reference hash set 328 and displaying the corresponding data item 320a in a modified fashion based on hash presentation rules 342 in a forensic data review user interface (FDRUI) 354, according to an embodiment.

The method 800 may be encoded as computer-executable instructions that, when executed by a processor of a computing device (such as the processor 302), cause the computing device to perform the various steps of the method 800. The method 800 may be implemented by the computer system 300 of FIG. 3. In particular, the method 800 or a portion thereof may be implemented by the presentation module 356 of FIG. 3.

The reference hash set 328 may have been generated according to the method 400. Categorization data 340 associated with the hashed data item 329 includes an "include but modify" tag.

At 802, the method 800 includes receiving a selection of a forensic data collection 318 via the FDRUI 354 for display. The selection may be received at the client-side software module 308 and transmitted to the server-side software module 310. The selected forensic data collection 318 may be displayed at the display 352 (i.e., all data items 320 of the hash set 328 may be displayed according to presentation rules 342).

At 804, the method 800 includes generating and displaying a modified version of any data item 320 whose associated presentation rules 342 include an "include but modify" tag. Because the categorization data 340 associated with the data item 320a or hashed data item 329a includes the "include but modify" tag, a modified version of the data item 320a is generated and displayed.

In an embodiment, generating a modified version of the data item 320a includes blurring or otherwise obscuring all or a portion of the data item 320a or a copy of the data item 320a. For example, the data item may be an image file that is both highly relevant to the forensic investigation but also sensitive in content. Generating and displaying a modified (e.g., blurred) version of the image content in the image file may enable the image to both be presented differently to before it was tagged (e.g., presenting more prominently in the FDRUI 354) to draw a user's attention to the data item 320a while also avoiding display of the sensitive content. One scenario in which such a technique may be beneficial is with child sexual abuse material (CSAM), which can include images or video that are extremely sensitive and should not be reviewed beyond what is absolutely necessary. Modification may be achieved, for example, by smoothing colour transition between pixels in an image.

In other embodiments, modifying the data item 320a includes modifications other than blurring. In an embodiment, modifying the data item 320a includes greyscaling the data item 320a. In an embodiment, modifying the data item 320a includes depixelating the copy of the data item 320a. In an embodiment, modifying the copy of the data item 320a includes redacting portions of the data item 320a. The foregoing modifications may be applied the data item 320a in addition to or instead of blurring the data item 320a. The foregoing modifications may be applied to all or part of the data item 320a. For example, a first section of the data item 320a may be subject to blurring, and/or a second section of the data item 320a may be subject to greyscaling.

Displaying the modified version of the data item 320a may include displaying the categorization data 340, such as the presentation rules 342, metadata 344 associated with the data item 320a, and/or other metadata including any one or more of hash metadata, a creator, and descriptive data in respect of the data item 320a whose associated categorization data 340 includes the "include but modify" tag. The descriptive data may include a text string or the like specifying one or more reason(s) for applying the "include but modify" tag to the hashed data item 329a.

In an embodiment, all data items 320 are listed in a window or menu for selection by the user. Those data items 320 associated with an "include but modify" tag have a visible symbol (e.g., a coloured icon, such as a dot) indicating the "include but modify" tag displayed with metadata of the data item (e.g., file identifier, other metadata such as size, file, or artifact type).

The "include but modify" tag may advantageously be used to save computer resources in not displaying all details of the data items 320a previously tagged for inclusion but modification. Furthermore, time of forensic examiners may be saved in the display 352 only displaying a modified copy of the data items 320 and therefore not causing review of all details of the data items 320 by the forensic examiners. Upon reviewing a data item 320a on a first occasion and determining that the data item 320a should be included but only displayed in a modified fashion, a forensic examiner may cause the system 10 to perform the method 800 to display only a modified copy of the data item 320a.

In an embodiment, displaying the modified version of the data item 320a includes drawing attention to the modified version of the data item 320a. Drawing attention to the modified version of the data item 320a may include displaying the modified version among a list of data items 320a to review. Drawing attention to the modified copy of the data item 320a may include displaying a pop-up window whose content includes the modified copy of the data item 320a. Drawing attention to the modified copy of the data item 320a may include displaying presentation data 342, file metadata associated with the copy of the data item 320a or with the data item 320a, and/or metadata 344 including any one or more of hash metadata, a creator, and descriptive data. Displaying the modified copy of the data item 320a further includes displaying the contents of the copy of the data item 320a as modified.

In an embodiment, all data items 320 are displayed in a list in a window or menu for selection by the user. Those data items 320 associated with an "include but modify" tag have a visible symbol (e.g., a coloured dot) indicating the "include but modify" tag.

In an embodiment, the "include but modify" tag is applied to certain data items 320 relevant to a forensic investigation where it is not desirable that subsequent forensic examiners view the certain data items 320, such as CSAM or other sensitive data/content.

Figure 9:
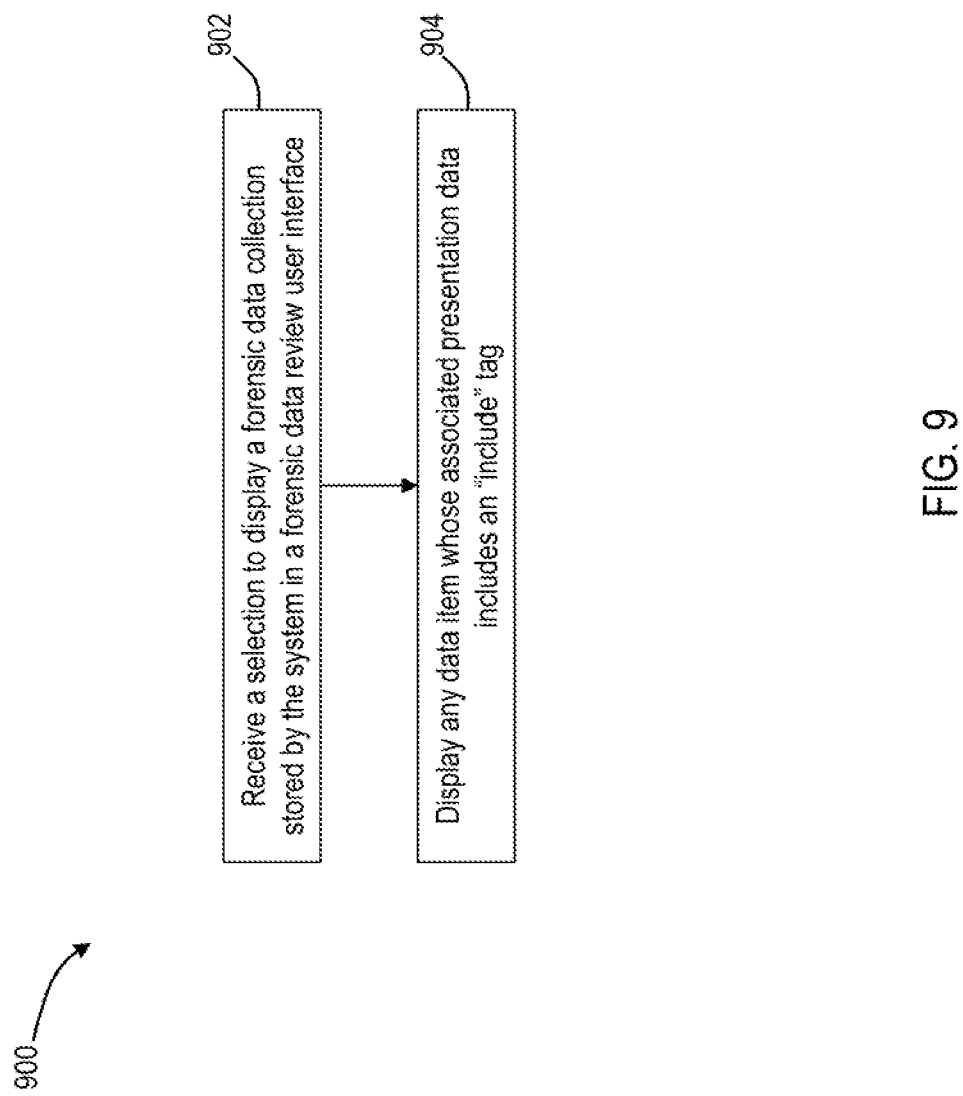
FIG. 9 is a flow diagram of a method of adding a hash of a file to be included in review to a reference hash set and displaying the file based on hash presentation rules in a forensic data review user interface, according to an embodiment.

Referring now to FIG. 9, shown therein is a flow diagram of a method 900 of adding a hashed data item 329a that is to be included and displayed for presentation/review in a FDRUI 354 to a reference hash set 328 and displaying the corresponding data item 320a based on hash presentation rules 342 in the FDRUI 354, according to an embodiment.

The method 900 may be encoded as computer-executable instructions that, when executed by a processor of a computing device (such as the processor 302), cause the computing device to perform the various steps of the method 900. The method 900 may be implemented by the computer system 300 of FIG. 3. In particular, the method 900 or a portion thereof may be implemented by the presentation module 356 of FIG. 3.

The reference hash set 328 may have been generated according to the method 400. Categorization data 340 associated with the hashed data item 329 includes an "include" tag.

At 902, the method 900 includes receiving a selection of forensic data collection 318 for display via the FDRUI 354. The selection may be received at the client-side software module 308 and transmitted to the server-side software module 310. The selected forensic data collection 318 may be displayed at the display 352 (i.e., all data items 320 of the hash set 328 may be displayed according to presentation rules 342).

At 904, the method further includes displaying any data item 320 whose associated presentation data 340 includes the "include" tag. Because the categorization data 340 associated with the data item 320a includes the "include" tag, the data item 320a is displayed according to the presentation rules 342. In doing so, the data item 320a is displayed at the display 352.

Displaying the data item 320a whose associated categorization data includes the "include" tag may include displaying alongside the data item 320a the presentation rules 342, the tags 340, metadata 344 associated with the data item 320a, and/or other metadata including any one or more of hash metadata, a creator, and descriptive data in respect of the data item 320a whose associated categorization data includes the "include" tag. The descriptive data may include a text string or the like specifying one or more reason(s) for applying the "include" tag to the hashed data item 329a.

In an embodiment, displaying the data item 320a includes drawing attention to the data item 320a.

Drawing attention to the data item 320a may include displaying the data item 320a among a list of data items 320 labeled or identified as "to review" or similar. Drawing attention to the data item 320a may include displaying a pop-up window whose content includes the data item 320a. Drawing attention to the data item 320a may include displaying presentation rules 342, file metadata associated with the data item 320a, and/or metadata 344 including any one or more of hash metadata, a creator, and descriptive data. Displaying the data item 320a further includes displaying the contents of the data item 320a. The descriptive data may include a text string or the like specifying one or more reason(s) for applying the "include" tag to the hashed data item 329a.

In an embodiment, all data items 320 are listed in a window or menu for selection by the user. Those data items 320 associated with an "include" tag have a visible symbol (e.g., a coloured icon, such as a dot) indicating the "include" tag. The forensic examiner may be able to automatically view and scroll through all data items 320 associated with the "include" tag.

The "include" tag, as described herein, may advantageously be used to save computer resources and increase efficiency of forensic data review systems by avoiding determination of forensic relevance of the same data item on multiple occasions. Furthermore, time of forensic examiners may be saved by more prominently displaying data items 320 for review in the forensic data review user interface, where the prominence of display is based on hash comparison with a reference hash set 328 as described herein. In using such an approach, the relevance of a data item 320a may need to be determined only once by a first user and that relevance determination be reflected in the FDRUI 354 in subsequent reviews by either the same user or other users. Reviewing forensic data in the FDRUI 354 may be computer resource (e.g. processing) intensive, and thus simplifying display and review in an automated fashion may provide improvements to the functioning of computer systems for forensic data review.

Referring now to FIG. 10, shown therein is a flow diagram of a method 1100 of generating and displaying a forensic data review user interface (FDRUI) based on one or more reference hash sets 328, according to an embodiment.

The method may be implemented by the computer system 300 of FIG. 3 or the system 10 of FIG. 1.

The FDRUI may be the FDRUI 354 discussed in relation to the computer system 300 of FIG. 3.

At 1102, at least one data item in a forensic data collection selected for display is hashed to generate a hash value of the at least one data item.

The forensic data collection may be the forensic data collection 318 of FIG. 3. The forensic data collection may be selected for display via user input data provided to a user interface. For example, the system may generate and display a user interface including one or more selectable forensic data collections. In an embodiment, the user interface is a forensic investigation or case "overview" interface or the like that displays various descriptive data about the forensic investigation including one or more target devices from which forensic data has been acquired and one or more forensic data collections extracted from the one or more target devices.

Hashing of the at least one data item may be performed by the hashing module 338 of FIG. 3 or similarly configured module.

At 1104, the hash value generated at 1002 is compared to hash values in at least one reference hash set stored and maintained by the system. This may be done using any suitable technique for comparing hash values. The at least one reference hash set may be the reference hash set 328 of FIG. 3.

At 1106, a determination is made by the system as to whether the hash value of the at least one data item matches a hash value in the at least one reference hash set.

If the hash value of the at least one data item does not match any hash values in the at least one reference hash set at 1106, the method proceeds to 1008.

At 1108, the forensic data collection is displayed in a forensic data review user interface, including the at least one data item. The at least one data item is displayed according to a default display property or format.

"Default" in this context is used as described herein and in contrast to the "varied" display property described below. In this sense, "default" display property or format may be considered an "unvaried" or "unchanged" display property or format. Generally, in such cases, the at least one data item, and the forensic data collection, will display in the forensic data review user interface as they would normally be displayed according to the rules of the forensic data review user interface display encoded in the forensic data review application. In other words, the system may include rules for presenting and displaying forensic data collections and data items thereof in forensic data review user interfaces that are encoded in the forensic data review software application and which may be used by the system to configure and present the forensic data collection and data items in the FDRUI under normal circumstances (i.e., when no matches to any hash sets have been identified). Such rules may be modified, as described in the present disclosure, through reference hash sets (e.g., hash set 328) such that the display of one more data items in the forensic data collection to be displayed in the FDRUI is varied or changed.

If the hash value of the at least one data item matches a hash value in the at least one reference hash set at 1106, the method proceeds to 1110.

At 1110, a display property or format of the at least one data item in the FDRUI is varied or changed according to at least one presentation rule associated with the matching hash value.

In some cases, the display property or format may be changed to "do not display" or similar, such that the at least one item is not displayed in the FDRUI.

Optionally, at 1112, a presentation rule may be assigned as an attribute or display property to the at least one data item in the forensic data collection. The presentation rule may be the same as the presentation rule associated with the matching hash value. This assignment may enable the at least one data item, having been identified as matching a hash value in a hash set, to have its display properties match the presentation rule in future instances of forensic data review user interface generation that is independent of hashing the data item or referencing the hash set.

At 1114, the forensic data collection is displayed in a forensic data review user interface including the at least one data item. The at least one data item is displayed in the forensic data review user interface according to the varied display property.

It should be noted that "displaying" in the context of 1114 may include not displaying where the presentation rule for the at least one data item has been changed to "do not display" or similar.

Advantageously, the hash value 334a of a hashed data item 329a may be compared at the beginning and end of a forensic investigation to evidence that the data item 320a has not been altered or tampered with in any way. In an embodiment, where fuzzy hashing has been used in the present disclosure, conventional hashing, e.g., cryptographic hashing, may nevertheless be used to evidence that each data item 320 has not been altered or tampered with in any way.

While the above description provides examples of one or more apparatus, methods, or systems, it will be appreciated that other apparatus, methods, or systems may be within the scope of the claims as interpreted by one of skill in the art.

The invention claimed is:

1. A method of presenting forensic data in a forensic data review user interface, the method comprising executing via a computing device comprising one or more processors:
   receiving a selection via the forensic data review user interface to display a forensic data collection stored in a data storage device;
   in response to receiving the selection, hashing at least one forensic data item in the forensic data collection to generate a hash value;
   determining that the hash value matches a reference hash value in at least one reference hash set;
   varying a default display property of the at least one forensic data item according to a presentation rule encoded in the reference hash set and associated with the reference hash value to obtain a varied display property, wherein the varied display property comprises instructions for including and modifying the at least one forensic data item in review by generating and displaying a modified version of the at least one forensic data item in the forensic data review user interface, and wherein modifying the at least one forensic data item in review comprises one or more of blurring, greyscaling, and depixelating at least part of a copy of the at least one forensic data item to produce a modified version of the at least one forensic data item;
   providing a selectable option to display the at least one forensic data item in the forensic data review user interface in an unmodified format; and
   displaying the forensic data collection in the forensic data review user interface including the at least one forensic data item, wherein the at least one forensic data item is displayed according to the varied display property.

2. The method of claim 1, wherein the varied display property comprises instructions to exclude the at least one forensic data item from review by not displaying the at least one forensic data item in the forensic data review user interface.

3. The method of claim 2, wherein excluding the at least one forensic data item from review comprises encoding a presentation rule that the at least one forensic data item is not to be displayed in further forensic investigations.

4. The method of claim 1, wherein the varied display property comprises instructions to exclude the at least one forensic data item from review by displaying the at least one forensic data item less prominently in the forensic data review user interface than other forensic data items in the forensic data collection whose display properties do not comprise instructions to exclude the further forensic data items.

5. The method of claim 1, wherein the varied display property comprises instructions to include the at least one forensic data item in review by displaying the at least one forensic data item in the forensic data review user interface.

6. The method of claim 5, wherein including the at least one forensic data item in review comprises displaying the at least one forensic data item more prominently in the forensic data review user interface than further forensic data items whose display properties do not comprise instructions to include the further forensic data items.

7. The method of claim 1, wherein modifying the at least one forensic data item in review further comprises redacting at least part of the copy of the at least one forensic data item to produce the modified version of the at least one forensic data item.

8. The method of claim 1, wherein the reference hash set is common to multiple users across multiple forensic data collections.

9. The method of claim 1, further comprising receiving further presentation rules to be encoded in the reference hash set and associated with the reference hash value.

10. The method of claim 1, further comprising receiving metadata comprising descriptive data indicating why the hashed data item was added to the reference hash set or why the presentation rule was applied to the hashed data item.

11. The method of claim 1, wherein hashing the at least one forensic data item in the forensic data collection to generate the hash value comprises performing the hashing using a cryptographic hash algorithm or a fuzzy hashing algorithm.

12. A method of generating a reference hash set for managing presentation of forensic data in a forensic data review user interface, the method comprising executing via a computing device comprising one or more processors:
   displaying a forensic data collection including at least one forensic data item in the forensic data review user interface;
   receiving a selection via the forensic data review user interface of the at least one forensic data item to be added to a reference hash set;

in response to receiving the selection, hashing the at least one forensic data item to obtain a reference hash value and storing the reference hash value in the reference hash set;

generating and displaying a tagging user interface;

receiving via the tagging user interface reference hash categorization data including at least one presentation rule specifying a display property of the at least one data item in the forensic data review user interface; and storing the hash categorization data in the reference hash set in association with the reference hash value such that when a hash value of a second forensic data item is determined to match the reference hash value, the second forensic data item is displayed in the forensic data review user interface according to the at least one presentation rule;

wherein the at least one presentation rule comprises instructions to include the at least one forensic data item in review by displaying and blurring, greyscaling, or depixelating at least a part of a copy of the at least one forensic data item in the forensic data review user interface and providing a selectable option to display the at least one forensic data item in the forensic data review user interface in an unmodified format.

13. The method of claim 12, wherein storing the reference hash value in the reference hash set comprises checking the reference hash set to determine whether the reference hash value matches any hash value already stored in the reference hash set and deleting the reference hash value from the reference hash set where there is a match.

14. The method of claim 12, wherein the at least one presentation rule comprises one of instructions to exclude the at least one forensic data item from review by not displaying the at least one forensic data item in the forensic data review user interface, instructions to exclude the at least one forensic data item from review by displaying the at least one forensic data item less prominently in the forensic data review user interface than further forensic data items whose display properties do not comprise instructions to exclude the further forensic data items, instructions to include the at least one forensic data item in review by redacting at least a part of a copy of the at least one forensic data item in the forensic data review user interface, and instructions to include the at least one forensic data item in review by displaying the at least one forensic data item in the forensic data review user interface.

15. The method of claim 12, wherein receiving a selection via the forensic data review user interface of the at least one forensic data item to be added to a reference hash set comprises:

displaying a plurality of reference hash sets; and
receiving a selection of the reference hash set from among the plurality of reference hash sets.

16. The method of claim 12, wherein specifying the display property comprises varying the display property.

17. A system for presenting forensic data in a forensic data review user interface based on a reference hash set, the system comprising at least one data storage device and at least one processor, the at least one processor configured to:

receive a selection via the forensic data review user interface to display a forensic data collection stored in a data storage device;

in response to receiving the selection, hashing at least one forensic data item in the forensic data collection to generate a hash value;

compare the hash value to a reference hash value in the at least one reference hash set;

if the hash value does not match the reference hash value, then:
    display the forensic data collection in the forensic data review user interface including the at least one forensic data item, wherein the at least one forensic data item is displayed according to a default display property; and if the hash value matches the reference hash value, then:
    vary the default display property of the at least one forensic data item according to a presentation rule encoded in the reference hash set and associated with the reference hash value to obtain a varied display property;
    display the forensic data collection in the forensic data review user interface including the at least one forensic data item, wherein the at least one forensic data item is displayed according to the varied display property; and
    providing a selectable option to display the at least one forensic data item in the forensic data review user interface according to the unvaried default display property;

wherein the varied display property comprises instructions to include the at least one forensic data item in review by displaying and blurring, greyscaling, or depixelating at least a part of a copy of the at least one forensic data item in the forensic data review user interface.

18. The system of claim 17, wherein the varied display property comprises one of instructions to exclude the at least one forensic data item from review by not displaying the at least one forensic data item in the forensic data review user interface, instructions to exclude the at least one forensic data item from review by displaying the at least one forensic data item less prominently in the forensic data review user interface than further forensic data items whose display properties do not comprise instructions to exclude the further forensic data items, instructions to include the at least one forensic data item in review by redacting at least a part of the copy of the at least one forensic data item in the forensic data review user interface, and instructions to include the at least one forensic data item in review by displaying the at least one forensic data item in the forensic data review user interface.

19. The system of claim 17, wherein the reference hash set is common to multiple users across multiple forensic data collections.

* * * * *